US010695247B2

(12) United States Patent
Wilson et al.

(10) Patent No.: US 10,695,247 B2
(45) **Date of Patent: *Jun. 30, 2020**

(54) PATIENT SUPPORT WITH AN AIR PERMEABLE LAYER AND A SUPPORT LAYER, WITH INFLATION AND DEFLATION OF THE SUPPORT LAYER CONTROLLED IN RESPONSE TO PRESSURE SENSED AT A PRESSURE SENSING LAYER

(71) Applicant: Hill-Rom Services, Inc., Batesville, IN (US)

(72) Inventors: Bradley T. Wilson, Tyler, TX (US); Charles A. Lachenbruch, Batesville, IN (US); Christopher R. O'Keefe, Columbus, OH (US); Daniel K. Stevens, Summerville, SC (US); Darrell L. Borgman, Batesville, IN (US); Dennis S. Flessate, Goose Creek, SC (US); Eric R. Meyer, Batesville, IN (US); Gregory W. Branson, Greenfield, IN (US); John Alan Bobey, Daniel Island, SC (US); Jonathan H. Mueller, Mt. Pleasant, SC (US); Karen Janoff, Summerville, SC (US); Kenith W. Chambers, Batsville, IN (US); Rachel Hopkins King, Harrison, OH (US); Rebecca Anne Ginther, Dublin, OH (US); Reza Hakamiun, Charleston, SC (US); Richard B. Stacy, Woodstock, GA (US); Sohrab Soltani, Charleston, SC (US); Stephen L. Douglas, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/149,251

(22) Filed: Oct. 2, 2018

(65) Prior Publication Data

US 2019/0060146 A1 Feb. 28, 2019

Related U.S. Application Data

(60) Continuation of application No. 15/234,244, filed on Aug. 11, 2016, now Pat. No. 10,130,539, which is a (Continued)

(51) Int. Cl.
*A61G 7/057* (2006.01)
*A61G 7/05* (2006.01)
(Continued)

(52) U.S. Cl.
CPC ......... *A61G 7/05776* (2013.01); *A61G 7/015* (2013.01); *A61G 7/018* (2013.01);
(Continued)

(58) Field of Classification Search
CPC ............ A61G 2203/32; A61G 2203/34; A61G 2203/36; A61G 2203/42; A61G 2203/44
See application file for complete search history.

(56) References Cited

U.S. PATENT DOCUMENTS 3,563,272 A 2/1971 Mercier
5,003,654 A 4/1991 Vrzalik
(Continued)

FOREIGN PATENT DOCUMENTS

EP 0387045 A2 9/1990
EP 0663169 A1 7/1995
(Continued)

OTHER PUBLICATIONS

European Search Report, Application No. EP 07253048; The Hague (Place of Search); (dated Feb. 29, 2008).
(Continued)

*Primary Examiner* — Eric J Kurilla
(74) *Attorney, Agent, or Firm* — Kenneth L. Lilly

(57) ABSTRACT

A patient support includes a cover defining an interior region, an air permeable first layer located in the interior
(Continued)

region, and a support layer located beneath the air permeable first layer. A pressure sensing layer is located underneath the support layer. At least one air supply is coupled to the support layer. A controller is coupled to the air supply and to the pressure sensing layer. The controller controls inflation and deflation of the support layer in response to a signal from the pressure sensing layer.

27 Claims, 33 Drawing Sheets

Related U.S. Application Data continuation of application No. 14/302,740, filed on Jun. 12, 2014, now Pat. No. 10,098,798, which is a continuation of application No. 12/701,655, filed on Feb. 8, 2010, now Pat. No. 8,832,884, which is a division of application No. 11/781,309, filed on Jul. 23, 2007, now Pat. No. 7,657,956.

(60) Provisional application No. 60/821,494, filed on Aug. 4, 2006.

(51) Int. Cl.
*A61G 7/015* (2006.01)
*A61G 7/018* (2006.01)
*G06F 19/00* (2018.01)

(52) U.S. Cl.
CPC ......... *A61G 7/0525* (2013.01); *A61G 7/0527* (2016.11); *A61G 7/05769* (2013.01); *A61G 7/05784* (2016.11); *A61G 7/05792* (2016.11); *G06F 19/00* (2013.01); *A61G 2203/20* (2013.01); *A61G 2203/34* (2013.01); *A61G 2203/42* (2013.01); *A61G 2203/70* (2013.01); *A61G 2210/70* (2013.01); *A61G 2210/90* (2013.01)

(56) References Cited

U.S. PATENT DOCUMENTS

| | | | |
|---|---|---|---|
| 5,052,067 | A | 10/1991 | Thomas et al. |
| 5,379,471 | A | 1/1995 | Holdredge et al. |
| 5,611,096 | A | 3/1997 | Bartlett et al. |
| 5,623,736 | A | 4/1997 | Soltani et al. |
| 5,815,864 | A | 10/1998 | Shoop |
| 5,829,081 | A | 11/1998 | Pearce |
| 6,212,718 | B1 | 4/2001 | Stolpmann |
| 6,560,803 | B2 | 5/2003 | Zur |
| 6,584,628 | B1 | 7/2003 | Kummer et al. |
| 6,694,555 | B2 | 2/2004 | Soltani et al. |
| 6,848,135 | B1 | 2/2005 | Kohlman |
| 6,892,405 | B1 | 5/2005 | Dimitriu et al. |
| 7,409,735 | B2 | 8/2008 | Kramer et al. |
| 7,657,956 | B2 | 2/2010 | Stacy et al. |
| 7,698,765 | B2 | 4/2010 | Bobey et al. |
| 8,832,884 | B2 | 9/2014 | Stacy et al. |
| 2001/0052152 | A1 | 12/2001 | Soltani et al. |
| 2004/0158927 | A1 | 8/2004 | Soltani et al. |
| 2005/0229321 | A1 | 10/2005 | Phillips et al. |
| 2006/0085919 | A1 | 4/2006 | Kramer et al. |
| 2006/0101581 | A1 | 5/2006 | Blanchard et al. |
| 2006/0112489 | A1 | 6/2006 | Bobey et al. |
| 2008/0282471 | A1 | 11/2008 | Chambers et al. |
| 2009/0237264 | A1 | 9/2009 | Bobey et al. |
| 2014/0352074 | A1 | 12/2014 | Stacy et al. |

FOREIGN PATENT DOCUMENTS

| | | | |
|---|---|---|---|
| JP | 2007159981 | | 6/2007 |
| WO | 9939613 | A1 | 8/1999 |
| WO | 2005107674 | A2 | 11/2005 |

OTHER PUBLICATIONS

International Search Report, PCT/US06/26787, International filing date: Jul. 7, 2006; (dated Mar. 6, 2008).
European Search Report; EP Application No. 10004577; The Hague (Place of Search); dated Feb. 23, 2011 (Date of Completion).
Response to European Search Report; EP Application No. 10004577; dated Oct. 5, 2011.

PATIENT SUPPORT WITH AN AIR PERMEABLE LAYER AND A SUPPORT LAYER, WITH INFLATION AND DEFLATION OF THE SUPPORT LAYER CONTROLLED IN RESPONSE TO PRESSURE SENSED AT A PRESSURE SENSING LAYER

RELATED APPLICATIONS

This application is a continuation of U.S. patent application Ser. No. 15/234,244 filed on Aug. 11, 2016 and entitled "Patient Support with an Air Permeable Layer and with Air Flow Through the Air Permeable Layer Controlled as a Function of Pressure Sensed at a Pressure Sensing Layer", which is a continuation of U.S. patent application Ser. No. 14/302,740 filed on Jun. 12, 2014 and entitled "Patient Support with Air Bladder Control Sensitive to An Orientation Angle Sensor", which is a continuation of U.S. patent application Ser. No. 12/701,655 entitled "Patient Support with Orientation Sensitive Bladder Control" filed on Feb. 28, 2010, now U.S. Pat. No. 8,832,884, which is a divisional of Ser. No. 11/781,309, entitled "PATIENT SUPPORT" filed on Jul. 23, 2007, now U.S. Pat. No. 7,657,956 which claims priority to U.S. Provisional Patent Application Ser. No. 60/821,494 entitled "Patient Support" filed on Aug. 4, 2006, the contents of all of which are incorporated herein by reference. The present application is related to U.S. patent application Ser. No. 11/119,980, entitled PRESSURE RELIEF SURFACE, and U.S. patent application Ser. No. 11/119,991, entitled PATIENT SUPPORT HAVING REAL TIME PRESSURE CONTROL, and U.S. patent application Ser. No. 11/119,635, entitled LACK OF PATIENT MOVEMENT MONITOR AND METHOD, and U.S. patent application Ser. No. 11/120,080, entitled PATIENT SUPPORT, all of which were filed on May 2, 2005, all of which are assigned to the assignee of the present invention, and all of which are incorporated herein by this reference.

The present application is also related to U.S. Provisional Patent Application Ser. No. 60/636,252, entitled QUICK CONNECTOR FOR MULTIMEDIA, filed Dec. 15, 2004, which is assigned to the assignee of the present invention and incorporated herein by this reference.

The present application is also related to U.S. Provisional Patent Application Ser. No. 60/697,748, entitled PRESSURE CONTROL FOR A HOSPITAL BED and corresponding PCT application No. PCT/US06/26787 filed Jul. 7, 2006, and U.S. Provisional Patent Application Ser. No. 60/697,708, entitled CONTROL UNIT FOR A PATIENT SUPPORT, and corresponding PCT application No. PCT/US06/26788 filed Jul. 7, 2006, and U.S. Provisional Patent Application Ser. No. 60/697,723 entitled PATIENT SUPPORT and corresponding PCT Application No. PCT/US06/26620 filed Jul. 7, 2006 and PCT application No. PCT/US05/14897 entitled PATIENT SUPPORT filed May 2, 2005 all of which are incorporated herein by this reference.

BACKGROUND

The present invention relates to a device for supporting a patient, such as a mattress. In particular, the present invention relates to patient supports appropriate for use in hospitals, acute care facilities, and other patient care environments. Further, the present invention relates to pressure relief support surfaces and support surfaces that are configured to accommodate and operate with a variety of sizes and styles of beds, bed frames, and patient types.

Known patient supports are disclosed in, for example, U.S. Pat. No. 5,630,238 to Weismiller et al., U.S. Pat. No. 5,715,548 to Weismiller et al., U.S. Pat. No. 6,076,208 to Heimbrock et al., U.S. Pat. No. 6,240,584 to Perez et al., U.S. Pat. No. 6,320,510 to Menkedick et al., U.S. Pat. No. 6,378,152 to Washburn et al., and U.S. Pat. No. 6,499,167 to Ellis et al., all of which are owned by the assignee of the present invention and all of which are incorporated herein by this reference.

SUMMARY

According to one embodiment of the present invention, a patient support is provided, including a cover, an air permeable first layer, a second layer including first, second, and third zones, the first and second zones including a plurality of transverse bladders and the third zone including a plurality of upright can-shaped bladders, a first pressure sensing assembly positioned underneath the first zone, a second pressure sensing assembly positioned underneath the second zone, the first and second pressure sensing assemblies being operable to sense force applied to the first and second zones, respectively, and a controller operably coupled to the first and second pressure sensing assemblies to adjust pressure in one or more of the first, second, and third zones based on pressure signals received from the first and second pressure sensing assemblies.

According to another embodiment of the present invention, a patient support is provided, including a cover defining an interior region, an air permeable first layer located in the interior region, a first air supply coupled to the first layer to provide air flow through the first layer, a plurality of air bladders located beneath the air permeable first layer including one or more transverse bladders and one or more upright can-shaped bladders, a second air supply coupled to the air bladders to selectively inflate and deflate the air bladders, a first angle sensor located in the interior region in a first articulatable portion of the patient support, a second angle sensor located in the interior region in a second articulatable portion of the patient support, and a controller coupled to the first and second air supplies and the first and second angle sensors to control inflation and deflation of the air bladders in response to angle signals received from the first and second angle sensors and to control air flow through the air permeable layer.

According to another embodiment of the present invention, a patient support is provided including a cover, an air permeable first support layer located within the cover, an air supply coupled to the first support layer, a second support layer located beneath the first layer, the second layer including a head zone and a seat zone, a first sensing assembly located beneath the head zone, a second sensing assembly located beneath the seat zone, a controller to receive signals from the first and second sensing assemblies to determine whether the patient support is occupied by a patient and adjust the air flow through the air permeable first layer based on the signals from the first and second sensing assemblies.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

Aspects of the present invention are more particularly described below with reference to the following figures, which illustrate exemplary embodiments of the present invention.

DETAILED DESCRIPTION

Figure 1:
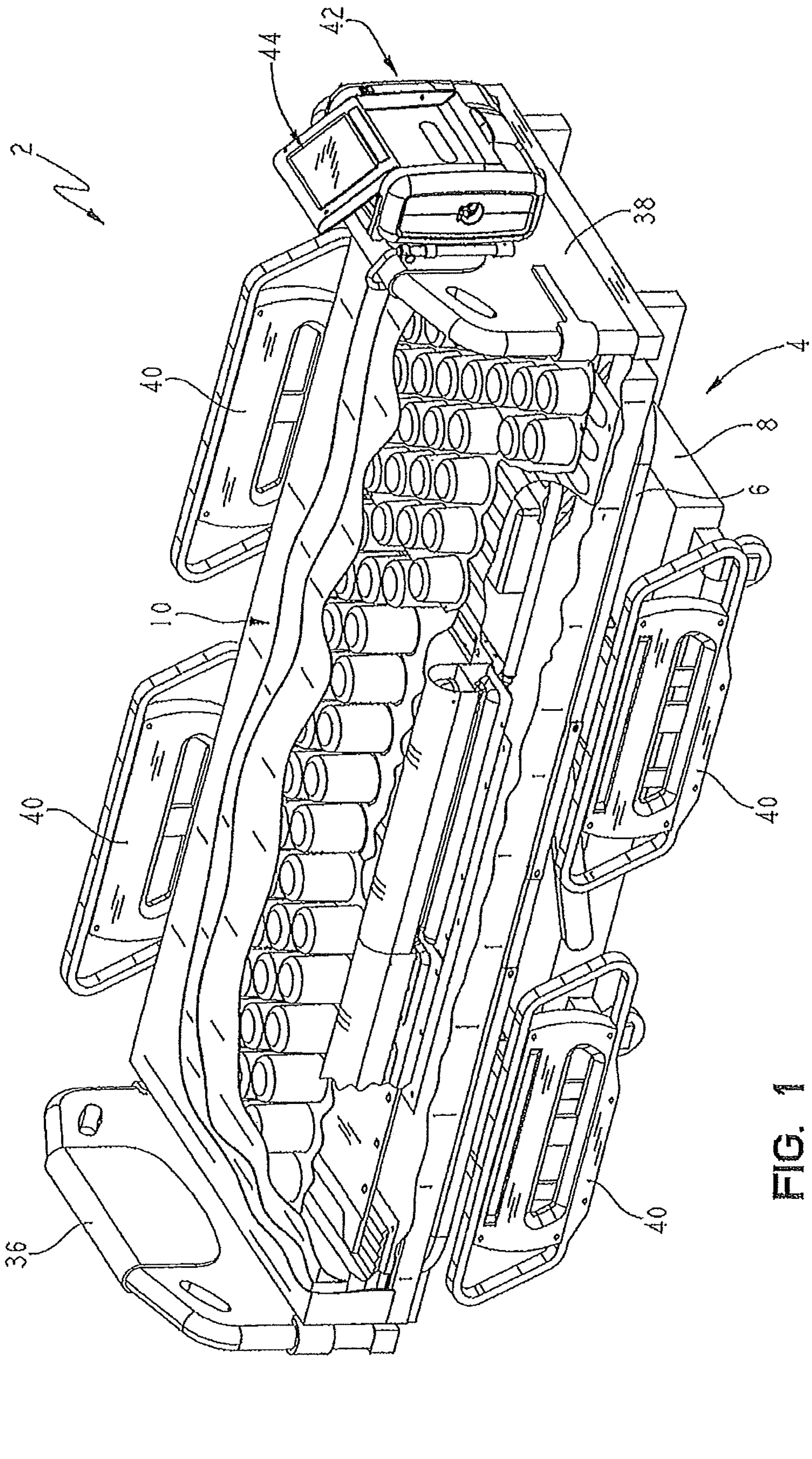
FIG. 1 is a perspective view of an embodiment of a patient support in accordance with the present invention, positioned on an exemplary hospital bed, with a portion of the patient support being cut away to show interior components of the patient support.

FIG. 1 shows an embodiment of a patient support or mattress 10 in accordance with the present invention. Patient support 10 is positioned on an exemplary bed 2. Bed 2, as illustrated, is a hospital bed including a frame 4, a headboard 36, a footboard 38, and a plurality of siderails 40.

Frame 4 of the exemplary bed 2 generally includes a deck 6 supported by a base 8. Deck 6 includes one or more deck sections (not shown), some or all of which may be articulating sections, i.e., pivotable with respect to base 8. In general, patient support 10 is configured to be supported by deck 6.

Patient support 10 has an associated control unit 42, which controls inflation and deflation of certain internal components of patient support 10, among other things. Control unit 42 includes a user interface 44, which enables caregivers, service technicians, and/or service providers to configure patient support 10 according to the needs of a particular patient. For example, support characteristics of patient support 10 may be adjusted according to the size, weight, position, or activity of the patient. User interface 44 is password-protected or otherwise designed to prevent access by unauthorized persons.

User interface 44 also enables patient support 10 to be adapted to different bed configurations. For example, deck 6 maybe a flat deck or a step or recessed deck. A caregiver may select the appropriate deck configuration via user interface 44. An exemplary control unit 42 and user interface 44 are described in detail in U.S. Provisional Patent Application Ser. No. 60/697,708, filed Jul. 8, 2005, and corresponding PCT application PCT/US2006/026788 assigned to the assignee of the present invention, and incorporated herein by reference.

Figure 2:
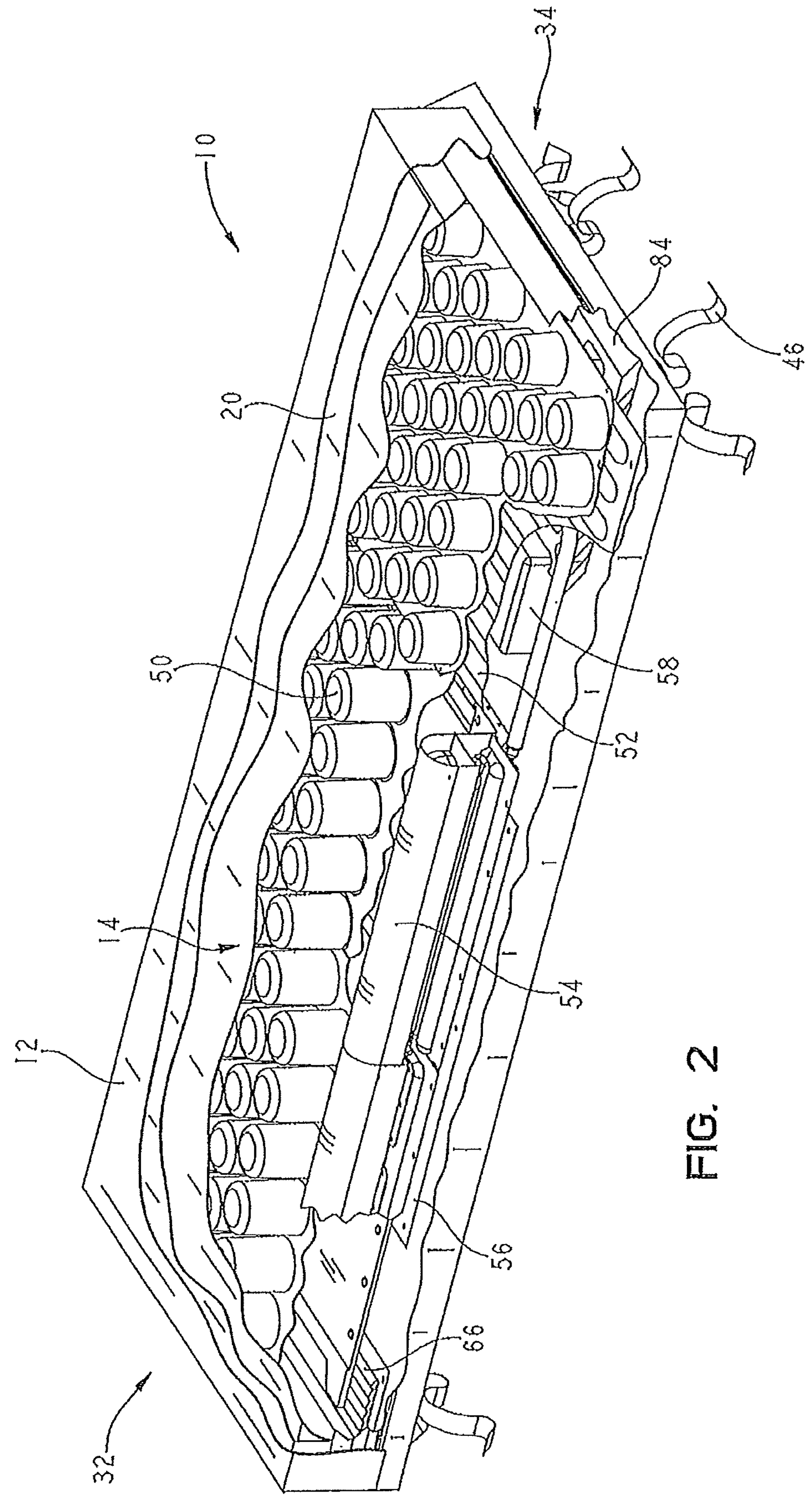
FIG. 2 is a perspective view of a patient support, with a portion being cut away to show interior components of the patient support.

Referring now to FIG. 2, patient support 10 has a head end 32 generally configured to support a patient's head and/or upper body region, and a foot end 34 generally configured to support a patient's feet and/or lower body region. Patient support 10 includes a cover 12 which defines an interior region 14. In the illustrated embodiment, interior region 14 includes a first layer 20, a second layer 50, and a third layer 52. However, it will be understood by those skilled in the art that other embodiments of the present invention may not include all three of these layers, or may include additional layers, without departing from the scope of the present invention.

In the illustrated embodiment, first layer 20 includes a support material, second layer 50 includes a plurality of inflatable bladders located underneath the first layer 20, and third layer 52 includes a plurality of pressure sensors located underneath one or more of the bladders of second layer 50, as more particularly described below.

Also located within interior region 14 are a plurality of bolsters 54, one or more filler portions 56, and a pneumatic valve control assembly, valve box, control box, or pneumatic box 58. A fire-resistant material may also be included in the interior region 14.

Patient support 10 may be coupled to deck 6 by one or more couplers 46. Illustratively, couplers 46 are conventional woven or knit or fabric straps including a D-ring or hook and loop assembly or Velcro®-brand strip or similar fastener. It will be understood by those skilled in the art that other suitable couplers, such as buttons, snaps, or tethers may also be used equally as well.

Figure 3:
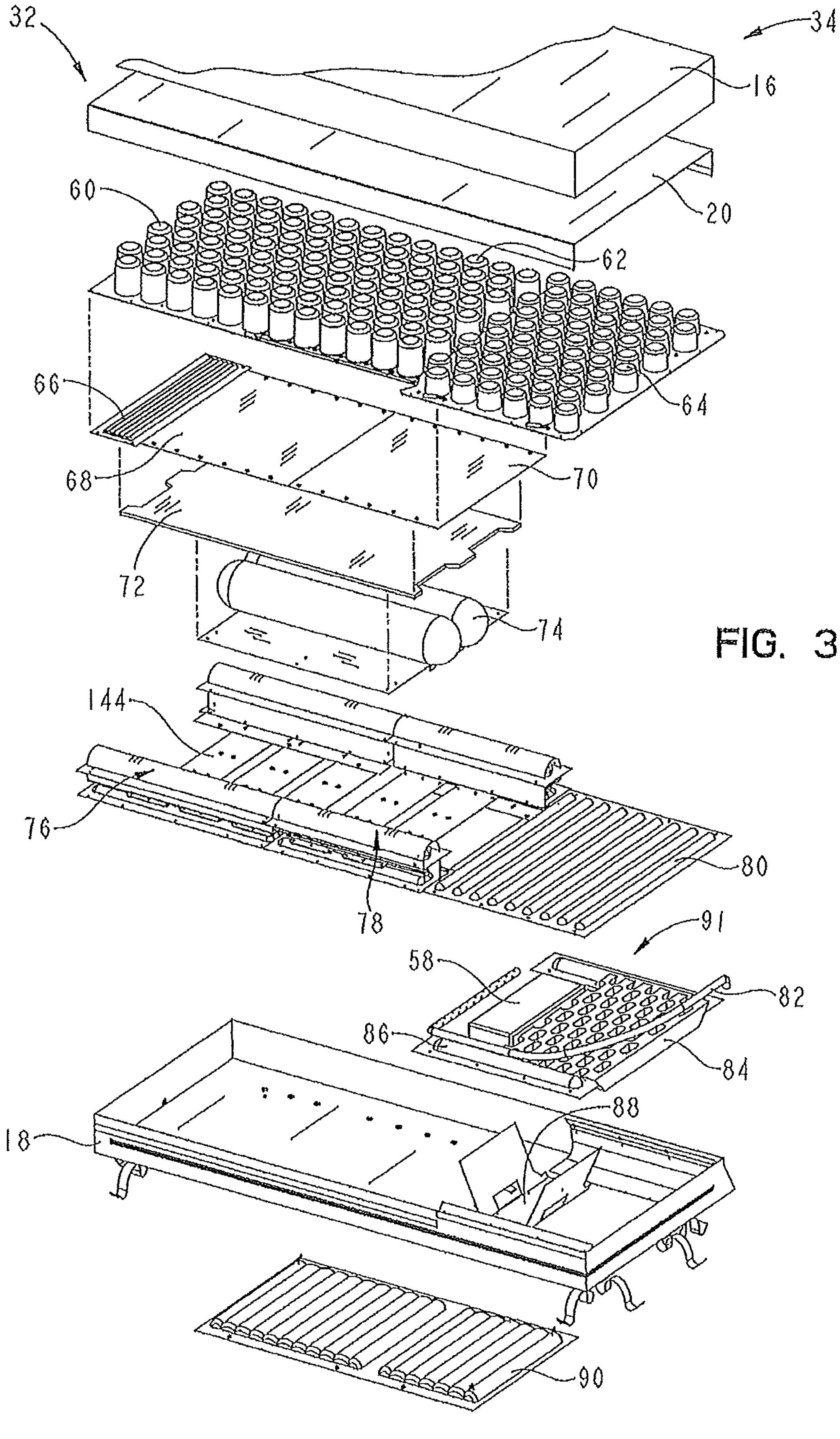
FIG. 3 is an exploded view of components of an illustrated embodiment of a patient support.

Components of one embodiment of a patient support in accordance with the present invention are shown in exploded view in FIG. 3. This embodiment of patient support 10 includes a top cover portion 16 and a bottom cover portion 18. Top cover portion 16 and bottom cover portion 18 couple together by conventional means (such as zipper, Velcro® strips, snaps, buttons, or other suitable fastener) to form cover 12, which defines interior region 14. While a plurality of layers and/or components are illustrated within interior region 14, it will be understood by those of skill in the art that the present invention does not necessarily require all of the illustrated components to be present.

Figure 4:
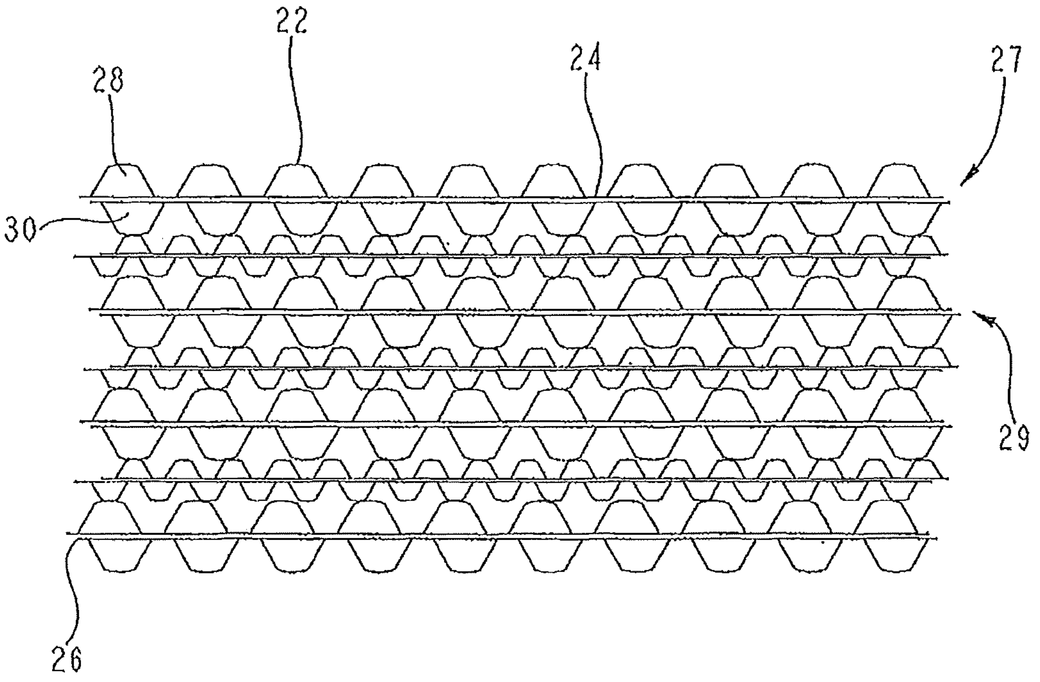
FIG. 4 is a simplified schematic view of an exemplary three-dimensional support material.

A first support layer 20 is located below top cover portion 16 in interior region 14. First support layer 20 includes one or more materials, structures, or fabrics suitable for supporting a patient, such as foam, inflatable bladders, or three-dimensional material. Suitable three-dimensional materials include Spacenet, Tytex, and/or similar materials. One embodiment of a suitable three dimensional material for support layer 20 is shown in FIG. 4, described below.

Returning to FIG. 3, a second support layer 50 including one or more inflatable bladder assemblies, is located underneath the first support layer 20. The illustrated embodiment of the second support layer 50 includes first, second and third bladder assemblies, namely, a head section bladder assembly 60, a seat section bladder assembly 62, and a foot section bladder assembly 64. However, it will be understood by those skilled in the art that other embodiments include only one bladder assembly extending from head end 32 to foot end 34, or other arrangements of multiple bladder assemblies, for example, including an additional thigh section bladder assembly. In the illustrated embodiment, bladder assemblies 60, 62, 64 include vertical-oriented upright bladders that are can-shaped or substantially cylindrical in shape. In general, bladder assemblies disclosed herein are formed from a lightweight, flexible air-impermeable material such as a polymeric material like polyurethane, urethane-coated fabric, vinyl, or rubber.

A pressure-sensing layer 69 illustratively including first and second sensor pads, namely a head sensor pad 68 and a seat sensor pad 70, is positioned underneath bladder assemblies 60, 62, 64. Head sensor pad 68 is generally aligned underneath head section bladder assembly 60, and seat sensor pad 70 is generally aligned underneath seat section bladder assembly 62, as shown. Head filler 66 maybe positioned adjacent head sensor pad 68 near head end 32 so as to properly position head sensor pad 68 underneath the region of patient support 10 most likely to support the head or upper body section of the patient. In other embodiments, a single sensor pad or additional sensor pads, for example, located underneath foot section bladder assembly 64, and/or different alignments of the sensor pads, are provided.

In the illustrated embodiment, a turn-assist cushion or turning bladder or rotational bladder 74 is located below sensor pads 68, 70. The exemplary turn-assist cushion 74 shown in FIG. 3 includes a pair of inflatable bladders 74*a*, 74*b*. Another suitable rotational bladder 74 is a bellows-shaped bladder. Another suitable turn-assist cushion is disclosed in, for example, U.S. Pat. No. 6,499,167 to Ellis, et al., which patent is owned by the assignee of the present invention and incorporated herein by this reference.

A plurality of other support components 66, 72, 76, 78, 80, 84, 86, 90 are also provided in the embodiment of FIG. 3. One or more of these support components are provided to enable patient support 10 to be used in connection with a variety of different bed frames, in particular, a variety of bed frames having different deck configurations. One or more of these support components may be selectively inflated or deflated or added to or removed from patient support 10 in order to conform patient support 10 to a particular deck configuration, such as a step or recessed deck or a flat deck.

The support components illustrated in FIG. 3 are made of foam, inflatable bladders, three-dimensional material, other suitable support material, or a combination of these. For example, as illustrated, head filler 66 includes a plurality of foam ribs extending transversely across patient support 10. Head filler 66 could also be an inflatable bladder. Filler portion 72 includes a foam layer positioned substantially underneath the sensor pads 68, 70 and extending transversely across the patient support 10. In the illustrated embodiment, filler portion 72 includes a very firm foam, such as polyethylene closed-cell foam, with a ½-inch thickness.

Head bolster assembly 76, seat bolster assembly 78, and foot section bolster assembly 86 each include longitudinally-oriented inflatable bladders laterally spaced apart by coupler plates 144. Bolster assemblies 76, 78, 86 are described below with reference to FIG. 12.

As illustrated, first foot filler portion 80 includes a plurality of inflatable bladders extending transversely across patient support 10, and second foot filler portion 84 includes a foam member, illustratively with portions cut out to allow for retractability of the foot section or for other reasons. Deck filler portion 90 includes a plurality of transversely-extending inflatable bladders. As illustrated, deck filler portion 90 includes two bladder sections located beneath the head and seat sections of the mattress, respectively, and is located outside of cover 12. Deck filler portion 90 may include one or more bladder regions, or maybe located within interior region 14, without departing from the scope of the present invention.

Also provided in the illustrated embodiment are a pneumatic valve box 58 and an air supply tube assembly 82. Receptacle 88 is sized to house pneumatic valve box 58. In the illustrated embodiment, receptacle 88 is coupled to bottom cover portion 18 by Velcro® strips. Pneumatic box 58 is described below with reference to FIGS. 14A-B.

In the illustrated embodiment, support layer 20 includes a breathable or air permeable material which provides cushioning or support for a patient positioned thereon and allows for circulation of air underneath a patient. The circulated air maybe at ambient temperature, or maybe cooled or warmed in order to achieve desired therapeutic effects.

Also in the illustrated embodiment, support layer 20 includes or is enclosed in a low friction air permeable material (such as spandex, nylon, or similar material) enclosure that allows support layer 20 to move with movement of a patient on patient support 10, in order to reduce shear forces, for instance. In other embodiments, the enclosure is made of a non-air permeable, moisture/vapor permeable material such as Teflon or urethane-coated fabric.

In FIG. 4, an exemplary three-dimensional material suitable for use in support layer 20 is depicted. This illustrated embodiment of support layer 20 includes a plurality of alternating first and second layers 27, 29. Each layer 27, 29 includes first and second sublayers 28, 30. As shown, the sublayers 28, 30 are positioned back-to-back and each sublayer 28, 30 includes a plurality of peaks or semicircular, cone, or dome-shaped projections 22 and troughs or depressions 24. A separator material 26 is provided between the first and second sublayers 28, 30. In other embodiments, separator material 26 may instead or in addition be provided between the layers 27, 29, or not at all.

Any number of layers and sublayers maybe provided as maybe desirable in a particular embodiment of support layer 20. Certain embodiments include 4 layers and other embodiments include 8 layers. In general, 0-20 layers of three dimensional material are included in support layer 20.

Suitable three-dimensional materials for use in support layer 20 include a polyester weave such as Spacenet, manufactured by Freudenberg & Co. of Weinheim, Germany, Tytex, available from Tytex, Inc. of Rhode Island, U.S.A., and other woven, nonwoven, or knit breathable support materials or fabrics having resilient portions, microfilaments, monofilaments, or thermoplastic fibers. Other embodiments of support layers and suitable three dimensional materials are described in U.S. patent application Ser. No. 11/119,980, entitled PRESSURE RELIEF SUPPORT SURFACE, filed on May 2, 2005, and assigned to the assignee of the present invention, the disclosure of which is incorporated herein by this reference.

Figure 5:
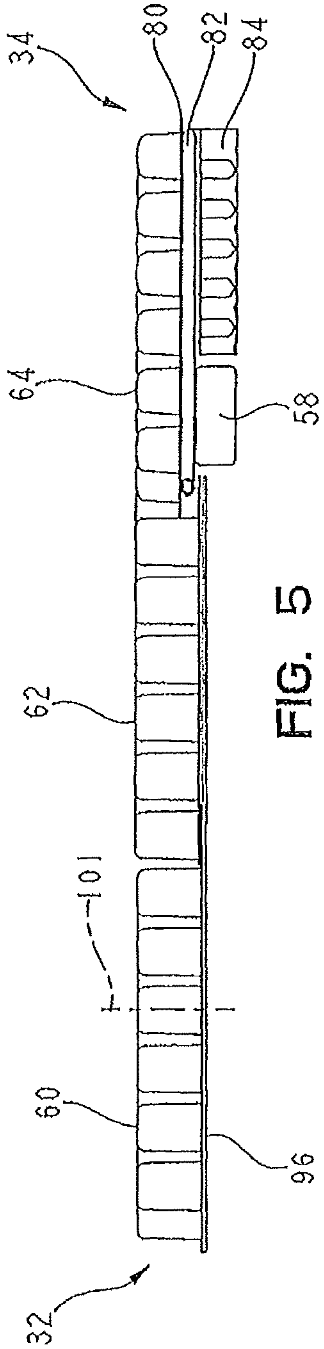
FIG. 5 is a side view of selected components of an embodiment of the patient support.

An exemplary second support layer including a base 96 and a plurality of inflatable bladders is shown in the side view of FIG. 5. In the illustrated embodiment, the inflatable bladders extend upwardly away from base 96 along a vertical axis 101 and are substantially can-shaped. The inflatable bladders are arranged into a plurality of bladder zones, namely head bladder zone 60, seat bladder zone 62, and foot bladder zone 64. First and second foot filler portions 80, 84 and tube assembly 82 are located in the foot end 34 of patient support 10 below foot bladder assembly 64. Pneumatic valve box 58 is also located in foot end 34 of patient support 10 underneath foot bladder zone 64. In other embodiments, pneumatic box 58 maybe located elsewhere in patient support 10 or outside patient support 10.

Figure 6:
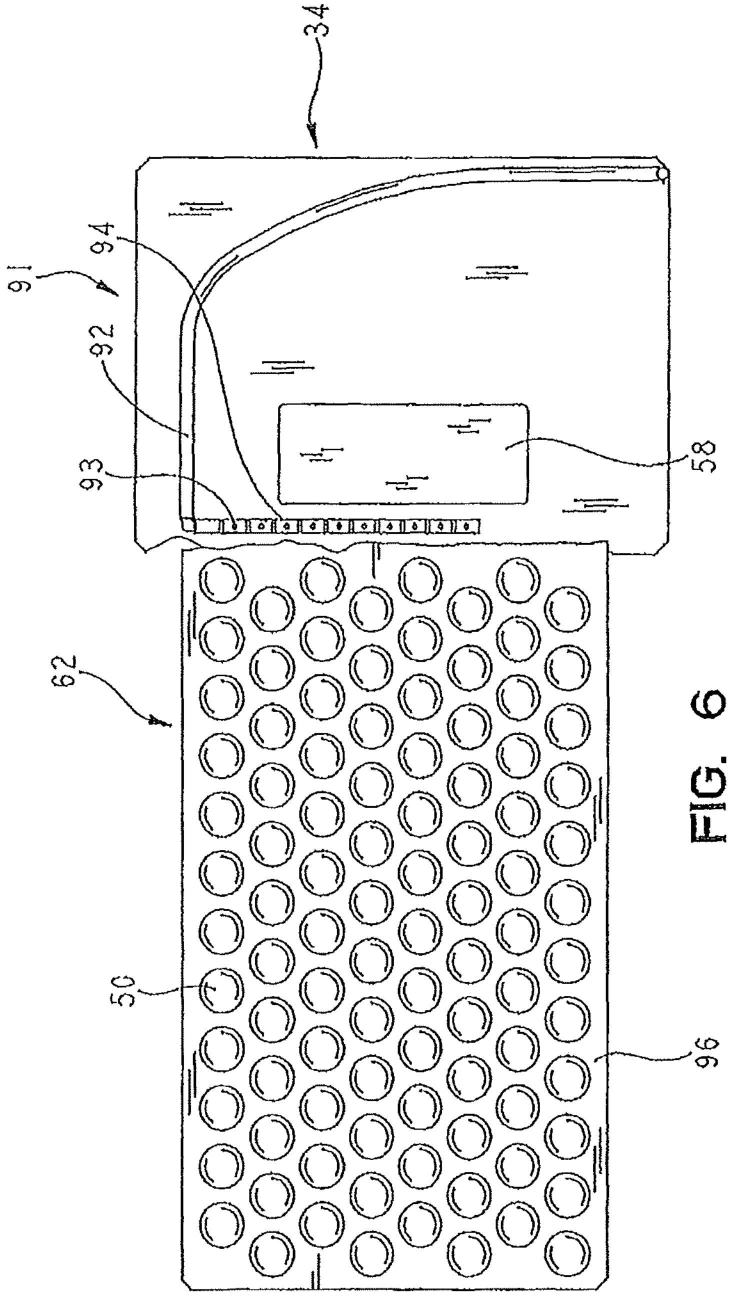
FIG. 6 is a top view of components of a patient support also shown in FIG. 5.

In FIG. 6, a top view of the above-described embodiment of patient support 10 is provided, with cover 12, support layer 20, and foot bladder assembly 64 removed to show the arrangement of one embodiment of a low air loss unit 91 and pneumatic box 58 in the foot section 34. Low air loss unit 91 includes a delivery tube 92 and an air distributor 94. Pneumatic box 58 includes valves, circuitry, and other components for connecting bladders 50 to an air supply 152 (FIG. 13) for inflation and deflation of vertical bladders 50. Pneumatic box 58 is described below with reference to FIGS. 14A and 14B. A low air loss device may include openings to allow air to exit from the air bladders. The low air loss device 91 may be used to move air through the topper layer at a rate in the range of about 2 to 10 cubic feet per minute (CFM). In general, low air loss devices are designed to aid in controlling the moisture level and the temperature of the patient.

Delivery tube 92 is connected to an air supply and provides air to air distributor 94. In the illustrated embodiment, delivery tube extends transversely and/or diagonally across the width of patient support 10 and maybe curved or angled toward seat section bladder zone 62. Tube 92 and distributor 94 may be made of a lightweight air impermeable material such as plastic.

As shown in FIG. 6, air distributor 94 is coupled to an end of delivery tube 92 located near seat section bladder zone 62. Air distributor 94 is an elongated hollow member including one or more apertures 93 which allow air to exit the tube 92 and circulate among vertical bladders 50 and three-dimensional material in first support layer 20. In certain embodiments, the air is directed upwardly through support layer 20. A vent (not shown) is provided in cover 12 to allow the circulated air to exit interior region 14. The vent is generally located on the opposite end of patient support 10 from the supply tube 92. An additional vent may be provided in the three-dimensional material enclosure, in embodiments where three-dimensional material 20 is enclosed in an enclosure within interior region 14 as discussed above. In those embodiments, the vent is also generally located opposite the supply tube 92.

In the illustrated embodiment, air provided by delivery tube 92 does not bleed upwardly through cover 12, however, in other embodiments cover 12 may include a breathable or air permeable material allowing for air to flow upwardly through the cover 12 to the patient. Also, in other embodiments, a single supply tube may be provided in place of delivery tube 92 and air distributor 94. While shown in the illustrated embodiment, the above-described air circulating feature is not necessarily a required component of the present invention.

Figure 7:
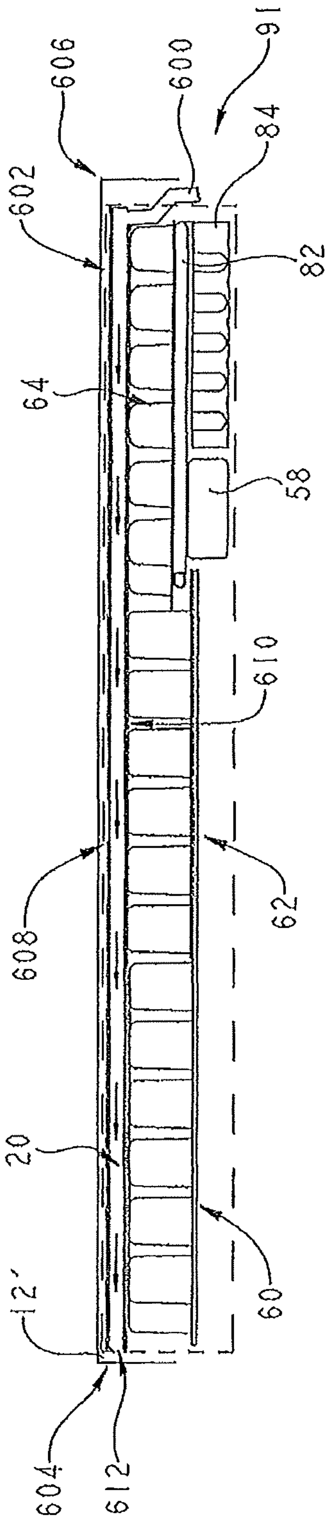
FIG. 7 is a side view of selected components of another embodiment of a patient support.

Another embodiment of a low air loss device 91' is shown in FIGS. 7-10. As shown in FIG. 7, low air loss device 91' includes a supply tube 600 and an enclosure 602. Enclosure 602 includes a head end 604 and a foot end 606. Supply tube 600 attaches to enclosure 602 at the foot end 606. Enclosure 602 includes an oblong opening 612 near head end 604 for allowing air to exit the enclosure and the support layer 20 having a plurality of layers of three dimensional material, see above for greater description. As described above, the plurality of layers of three dimensional material may have dimples facing upwards towards the patient or facing downward away from the patient. Enclosure 602 maybe formed of a vapor permeable and air impermeable material, as described above. Opening 612 may also include a series of slits.

Figure 8:
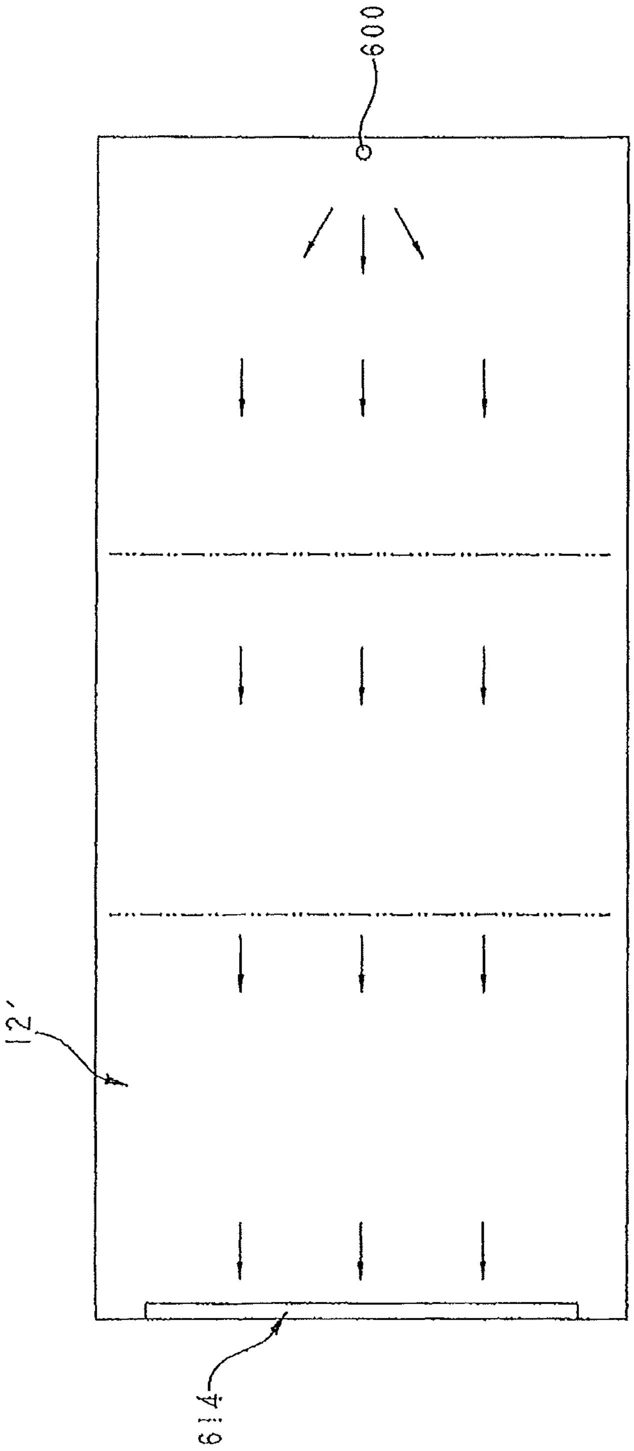
FIG. 8 is a top view showing air flow through the embodiment of the patient support shown in FIG. 7.

As shown in FIGS. 7-8, when the low air loss device 91' is activated, air flows toward the head end 606 through the support layer 20. The air flows out of opening 612 and exits the patient support 10 through a cover opening 614 in cover 12'. Cover opening 614 runs approximately the entire width of the cover 12' and includes snaps (not shown) to close portions of the opening. In alternative embodiments, opening 614 maybe be an air permeable material instead of an opening, or may include a zipper or Velcro® or hook and loop type fasteners instead of snaps.

Figure 9:
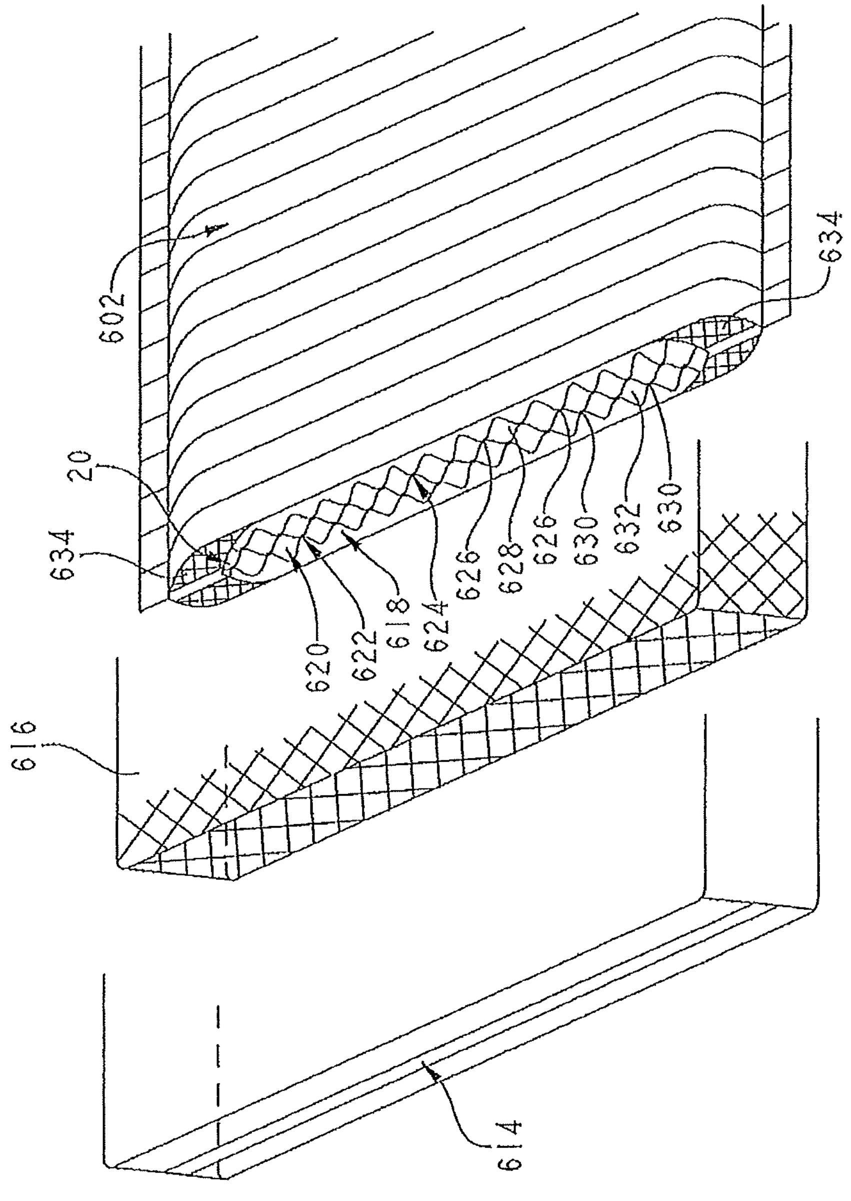
FIG. 9 is an exploded end view of components of an embodiment of the patient support.

As shown in FIG. 9, a fire resistant material 616 is placed within the enclosure 602. The fire resistant material 616 includes a loose weave making the fire resistant material air permeable. Additionally, support layer 20 includes first, second, third, and fourth layers of three dimensional material 618, 620, 622, 624. First layer 618 and second layer 620 are attached to each other at a plurality of first attachment locations 626 forming a plurality of upper channels 628. Third layer 622 and fourth layer 624 are attached to each other at a plurality of second attachment locations 630 forming a plurality of lower channels 632. Typically, an attachment point is located at a peak of one layer adjacent a valley of an adjoining layer. The air flows through upper and lower channels 628, 632. The air also flows through an outer region 634 located within the enclosure 602. Upper and lower channels 628, 632 allow air to more easily flow under the patient.

Figure 10:
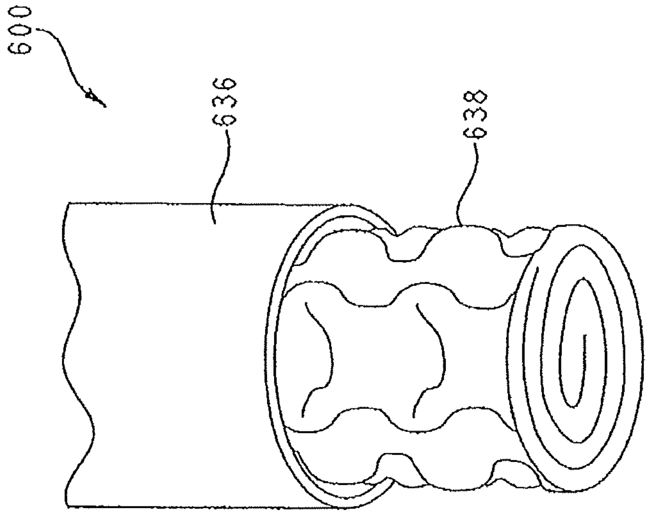
FIG. 10 is a perspective view of an air supply tube for a low air loss device.

One example of supply tube 600 is shown in FIG. 10. Supply tube 600 includes an outer body 636 and an inner body 638. Outer body 636 maybe formed of the same material as the enclosure. Inner body 638 is formed from a layer of rolled three dimensional material. The three dimensional material aids in preventing supply tube 600 from kinking or collapsing which may cut off or reduce the air supply to the enclosure 602. In alternative embodiments, supply tube 600 maybe formed from PVC, plastic, or any other conventional tubing material.

In alternative embodiments, enclosure 602 does not include support layer 20. In this embodiment, the opening 612 maybe located near foot end 606 or along at least one of the sides of the enclosure. In alternative embodiments, supply tube 600 attaches to enclosure 602 at the head end 604 or anywhere on the enclosure such as on a top surface 608, a bottom surface 610, or on a side surface (not shown) of the enclosure. In certain embodiments, supply tube 600 is integral with enclosure 602. In other embodiments, supply tube 600 attaches to a fitting (not shown).

In other embodiments, supply tube 600 is split by a T-fitting (not shown) and attaches to enclosure 602 in two or more locations. The supply tube in this embodiment is formed of PVC but may be formed from plastic or any other conventional tubing material.

Figure 12:
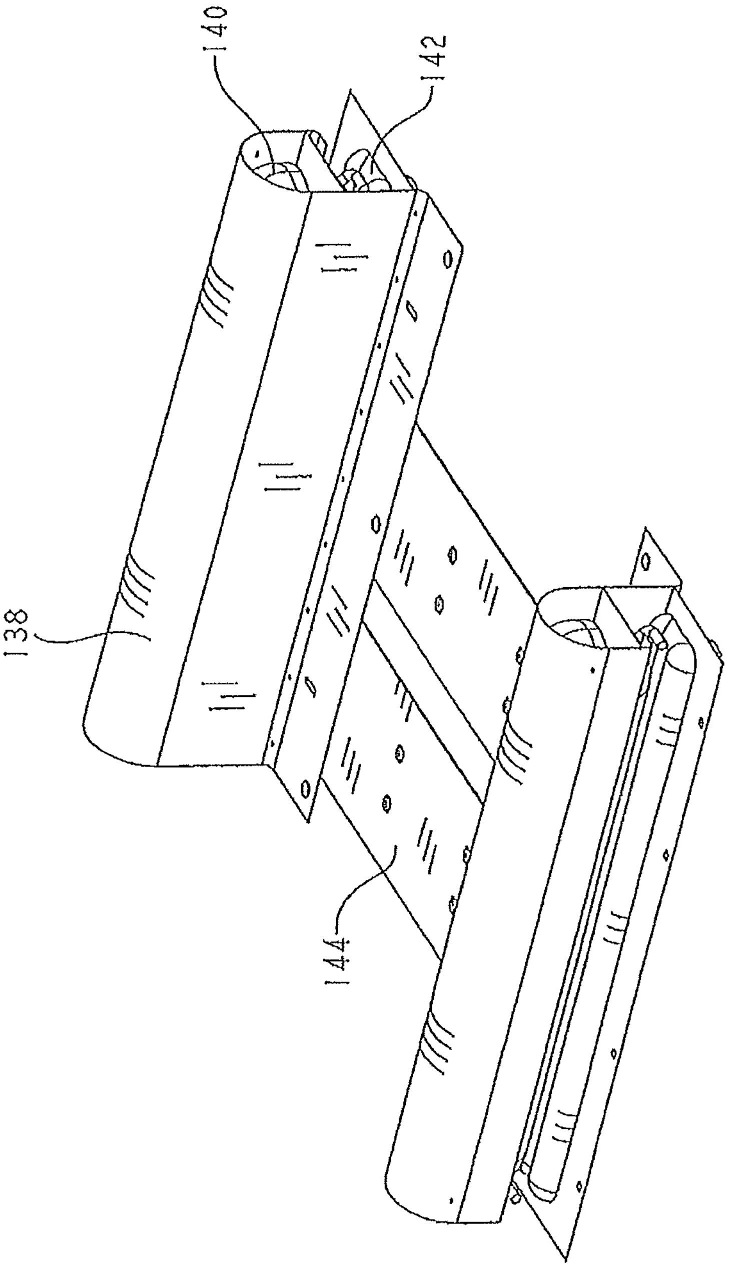
FIG. 12 is a perspective view of an exemplary bolster assembly.

FIG. 12 depicts a bolster assembly 76, 78. Bolster assemblies 76, 78 are generally configured to support portions of a patient along the longitudinal edges of patient support 10. One or more bolster assemblies 76, 78 may be provided in order to conform patient support 10 to a particular bed frame configuration, to provide additional support along the edges of patient support 10, aid in ingress or egress of a patient from patient support 10, maintain a patient in the center region of patient support 10, or for other reasons. For example, internal air pressure of the bolster bladders maybe higher than the internal bladder pressure of assembles 60, 62, 64, or maybe increased or decreased in real time, to accomplish one of these or other objectives.

Each bolster assembly 76,78 includes a plurality of bolsters, namely, an upper bolster 140 and a lower bolster 142, with the upper bolster 140 being positioned above the lower bolster 142. Each upper and lower bolster combination 140, 142 is configured to be positioned along a longitudinal edge of patient support 10. Each upper and lower bolster combination 140, 142 is enclosed in a cover 138.

In the illustrated embodiment, the bolsters 140, 142 are inflatable bladders. In other embodiments, either or both bolsters 140, 142 maybe constructed of foam, or filled with three-dimensional material, fluid, or other suitable support material. For example, in one embodiment, upper bolster 140 includes two layers of foam: a viscoelastic top layer and a non viscoelastic bottom layer, while lower bolster 142 is an inflatable bladder. The bolsters 140, 142 maybe inflated together, or separately, as shown in FIG. 13, described below.

In the illustrated embodiment, each support plate 144 is a rectangular member extending transversely across the width of the mattress 10. As shown in the drawings, there are five such rib-like members 144 spaced apart underneath the head and seat sections of the mattress. In other embodiments, each support plate 144 has its middle section (i.e., the section extending transversely) cut out so that only the two plate ends remain at each spaced-apart end (underneath the bolsters); thereby providing five pairs of support plates 144 spaced apart along the longitudinal length of the mattress 10.

Bolster assembly 86 is similar to bolster assemblies 76, 78 except that its upper layer includes the vertical bladders 50 of longitudinal sections 214, 216. Bolster assembly 86 has a longitudinally-oriented bladder as its lower bolster portion.

Figure 13:
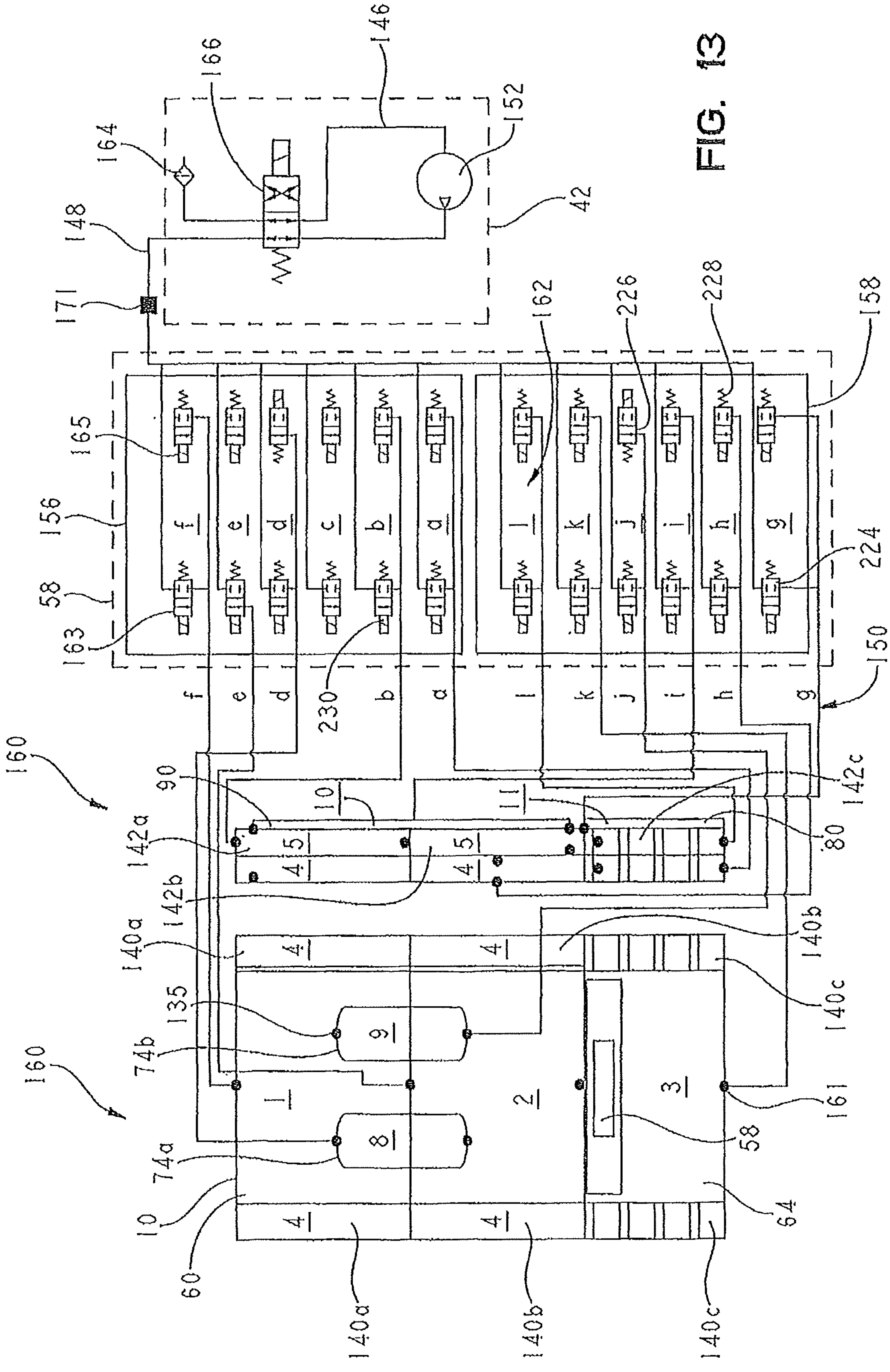
FIG. 13 is a simplified schematic view of air zones of the illustrated patient support and associated air supply system.

A schematic diagram of the pneumatic control system of patient support 10 is shown in FIG. 13. Reading FIG. 13 from second to first, there is shown a simplified top view of patient support 10 with portions removed to better illustrate the various air zones 160, a simplified side view of patient support 10, a schematic representation of pneumatic valve box 58, a schematic representation of control unit 42, and air lines 146, 148, 150 linking control unit 42, valve box 58, and air zones 160.

As shown in FIG. 13, air zones 160 of patient support 10 are assigned as follows: zone 1 corresponds to head section bladder assembly 60, zone 2 corresponds to seat section bladder assembly 62, zone 3 corresponds to foot section bladder assembly 64, zone 4 corresponds to upper side bolsters 140, zone 5 corresponds to lower side bolsters 142, zone 6 corresponds to upper foot bolsters 140, zone 7 corresponds to lower foot bolsters 142, zone 8 corresponds to first turn-assist bladder 74, zone 9 corresponds to second turn-assist bladder 74, zone 10 corresponds to deck filler 90, and zone 11 corresponds to foot filler 80.

An air line 150 couples each zone 160 to a valve assembly 162 in valve box 58. Valve box 58 is located in the foot section 34 of patient support 10. Illustratively, valve box 58 is releasably coupled to bottom portion 18 of cover 12 in interior region 14, i.e., by one or more Velcro®-brand fasteners or other suitable coupler.

Each air line 150 is coupled at one end to an inlet port 135 on the corresponding bladder or bladder assembly. Each air line 150 is coupled at its other end to a valve assembly 162. Each valve assembly 162 includes first or fill valve 163 and a second or vent valve 165. First valves 163 are coupled to air supply 152 of control unit 42 by air lines 148. First valves 163 thereby operate to control inflation of the corresponding zone 160 i.e. to fill the zone with air. Second valves 165 operate to at least partially deflate or vent the corresponding zone 160, for example, if the internal air pressure of the zone 160 exceeds a predetermined maximum, or if deflation is necessary or desirable in other circumstances (such as a medical emergency, or for transport of patient support 10).

Each valve 163, 165 has an open mode 224 and a closed mode 226, and a switching mechanism 228 (such as a spring) that switches the valve from one mode to another based on control signals from control unit 42. In closed mode 226, air flows from air supply 152 through the valve 163 to the respective zone 160 to inflate the corresponding bladders, or in the case of vent valves 165, from the zone 160 to atmosphere. In open mode 228, no inflation or deflation occurs.

In the illustrated embodiment, an emergency vent valve 230 is provided to enable quick deflation of turning bladders 74 which draws air from atmosphere through a filter 164 and also vents air to atmosphere through filter 164. Air supply 152 is an air pump, compressor, blower, or other suitable air source.

Air supply 152 is coupled to a switch valve 166 by air line 146. Switch valve 166 operates to control whether inflation or deflation of a zone occurs. An optional proportional valve 171 maybe coupled to air line 148 to facilitate smooth inflation or deflation of turn-assist bladders 74, or for other reasons.

In the illustrated embodiment, valve box 58 includes a first valve module 156 and a second valve module 158. First valve module 156 includes valves generally associated with a patient's first side (i.e., first side, from the perspective of a patient positioned on patient support 10) and second valve module 158 includes valves generally associated with a patient's second side (i.e., second side).

The various zones 160 are separately inflatable. Certain of the zones 160 are inflated or deflated to allow patient support 10 to conform to different bed frame configurations. For example, the deck filler 90 (zone 10 in FIG. 23) is inflated to conform patient support 10 to certain bed frame configurations, such as step deck configurations including the TotalCare® and CareAssist® bed frames, made by Hill-Rom, Inc., the assignee of the present invention, but is deflated when patient support 10 is used with a flat deck bed frame, such as the Advanta® bed made by Hill-Rom, Inc. As another example, the foot filler 80 (zone 11 in FIG. 23) is inflated when patient support 10 is used with the VersaCare®, TotalCare®, or CareAssist® beds, but the lower side bolsters 142 (zone 5 in FIG. 23) are not inflated when patient support 10 is used with a VersaCare® bed. As still another example, the lower foot bolsters 142 (zone 7 in FIG. 23) are inflated when patient support 10 is used on flat decks or other bed frames, including the Advanta® and VersaCare® bed frames made by Hill-Rom, Inc.

Figure 11A:
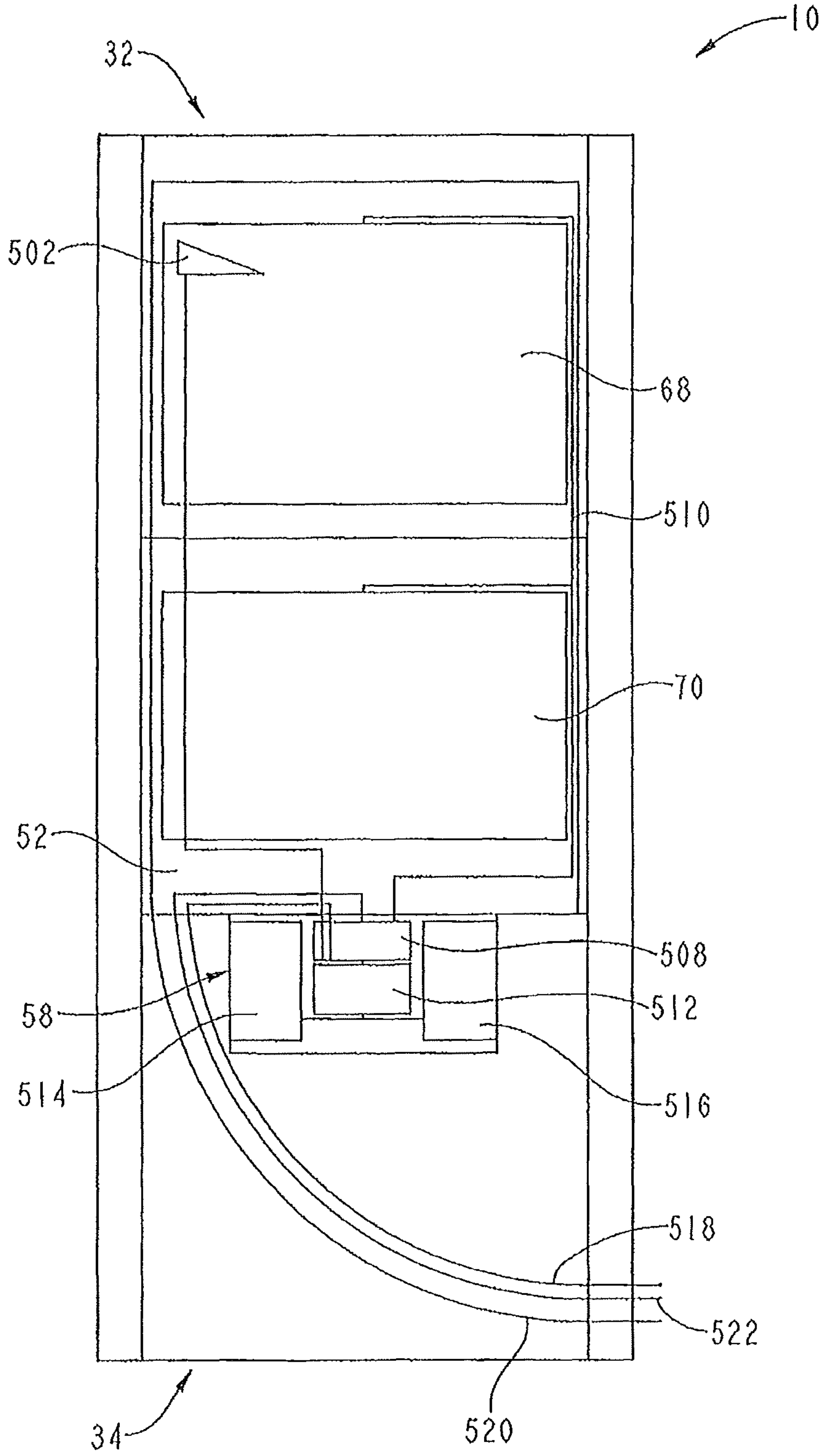
FIGS. 11A and 11B are schematic diagrams of portions of a control system for an embodiment of the patient support.
Figure 11B:
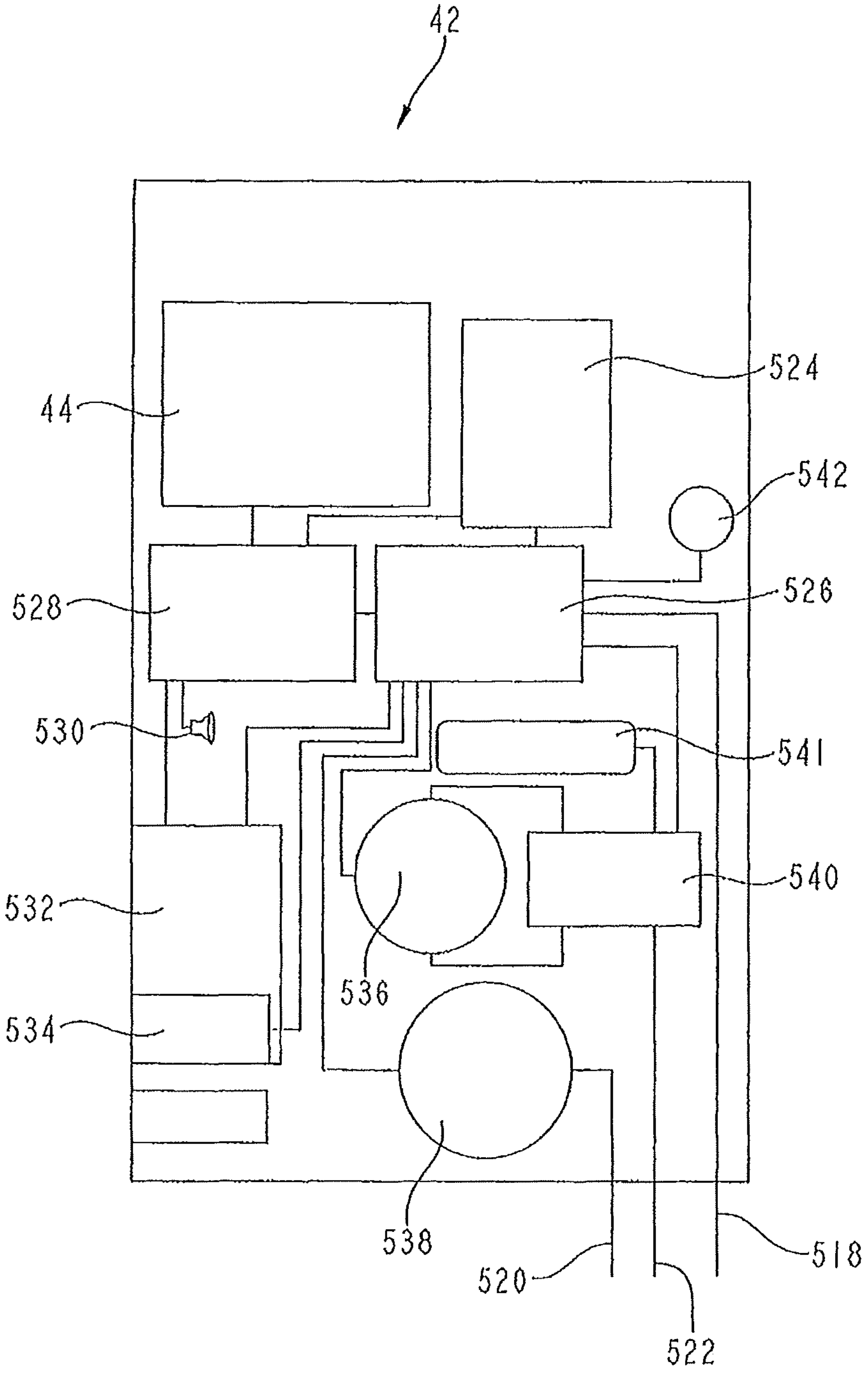

FIGS. 11A and 11B are a simplified schematic diagram of a control system and the patient support or mattress 10 of the present invention. FIG. 11A illustrates the patient support 10 including the various components of patient support 10 whereas FIG. 11B illustrates the control unit 42 and various components therein. The patient support 10 includes the sensor pad 52 which is coupled to the pneumatic valve control box 58 as previously described. The sensor pad 52 includes a head sensor pad 68 and a seat sensor pad 70. The head sensor pad 68 is located at the head end 32 of the mattress 10. The seat sensor pad 70 is located at a middle portion of the mattress 10 which is located between the head end 32 and a location of the pneumatic valve control box 58. The seat sensor pad 70 is located such that a patient laying upon the mattress 10 may have its middle portion or seat portion located thereon when in a reclined state. In addition, when the head end 32 of the mattress 10 is elevated, the seat portion of the patient is located upon the seat sensor pad 70. As previously described with respect to FIG. 3, the head sensor pad 68 is located beneath the head section bladder assembly 60 and the seat sensor pad 70 is located beneath the seat section bladder assembly 62. In this embodiment, each one of the sensors of the head sensor pad 68 or the seat sensor pad 70 is located beneath or at least adjacent to one of the can-shaped bladders or cushions 50. A head angle sensor 502 is coupled to the control box 58 where signals generated by the sensor 52 provide head angle information, which may be used to adjust pressure in the seat bladders 62.

The sensor pad 52 is coupled through the associated cabling to the pneumatic control box 58. The pneumatic control box 58 includes a multiplexer 508 coupled to the head sensor pad 68 and the seat sensor pad 70 through a signal and control line 510. The multiplexer board 508 is also coupled to an air control board 512 which is in turn coupled to a first valve block 514 and a second valve block 516. A communication/power line 518 is coupled to the control unit 42 of FIG. 11B. Likewise, a ventilation supply line 520 which provides for air flow through the patient support 10 for cooling as well as removing moisture from the patient is also coupled to the control unit 42 of FIG. 11B. An air pressure/vacuum supply line 522 is coupled to the control unit 42 as well.

The control unit 42 of FIG. 11B, also illustrated in FIG. 1, includes the display 44, which displays user interface screens, and a user interface input device 524 for inputting to the control unit 42 user selectable information, such as the selection of various functions or features of the present device. The selections made on the user interface input device 524 control the operation of the patient support 10, which can include selectable pressure control of various bladders within the mattress 10, control of the deck 6, for instance to put the bed 2 in a head elevated position, as well as displaying the current state of the mattress or deck position, and other features.

An algorithm control board 526 is coupled to the user interface input device 524. The algorithm control board 526 receives user generated input signals received through the input device 524 upon the selection of such functions by the user. The input device 524 can include a variety of input devices, such as pressure activated push buttons, a touch screen, as well as voice activated or other device selectable inputs. The algorithm control board 526 upon receipt of the various control signals through the user input device 524 controls not only the operation of the mattress 10 but also a variety of other devices which are incorporated into the control unit 42. For instance, the algorithm control board 526 is coupled to a display board 528 which sends signals to the display 44 to which it is coupled. The display board 528 is also connected to a speaker 530 which generates audible signals which might indicate the selection of various features at the input device 24 or indicate a status of a patient positioned on patient support (e.g. exiting) or indicate a status of therapy being provided to the patient (e.g., rotational therapy complete). The algorithm control board 526 receives the required power from power supply 532 which includes an AC input module 534, typically coupled to a wall outlet within a hospital room.

The algorithm control board 526 is coupled to an air supply, which, in the illustrated embodiment includes a compressor 536 and a blower 538. Both the compressor 536 and the blower 538 receive control signals generated by the algorithm control board 526. The compressor 536 is used to inflate the air bladders. The blower 538 is used for air circulation which is provided through the ventilation supply line 520 to the mattress 10. It is, however, possible that the compressor 536 may be used to both inflate the bladders and to circulate the air within the mattress 10. A pressure/vacuum switch valve 540 is coupled to the compressor 536 which is switched to provide for the application of air pressure or a vacuum to the mattress 10. A muffler 541 is coupled to the valve 540. In the pressure position, air pressure is applied to the mattress 10 to inflate the mattress for support of the patient. In the vacuum position, the valve 540 is used to apply a vacuum to the bladders therein such that the mattress maybe placed in a collapsed state for moving to another location or for providing a CPR function, for example. A CPR button 542 is coupled to the algorithm control board 526.

As illustrated, the algorithm control board 526, the compressor 536, the blower 538, and the user input device or user control module 524 are located externally to the mattress and are a part of the control unit 42, which maybe located on the footboard 38 as shown in FIG. 1. The sensors and sensor pad 52, the pneumatic valve control box 58, and the air control board or microprocessor 512 for controlling the valves and the sensor pad system 52 are located within the mattress 10. It is within the present scope of the invention to locate some of these devices within different sections of the overall system, for instance, such that the algorithm control board 526 could be located within the mattress 10 or the air control board 512 could be located within the control unit 42.

Figure 14A:
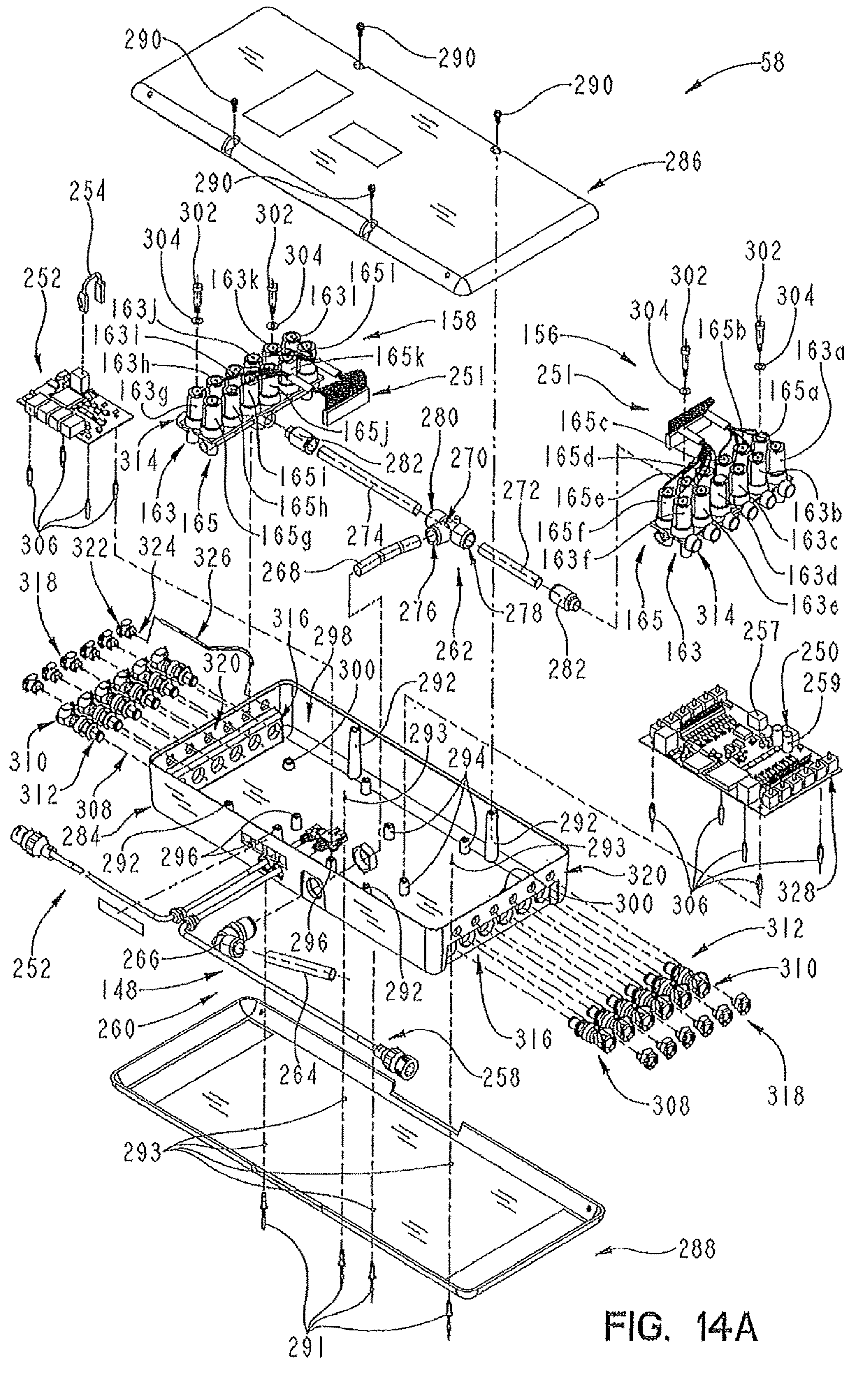
FIG. 14A is an exploded view of an exemplary pneumatic assembly.
Figure 14B:
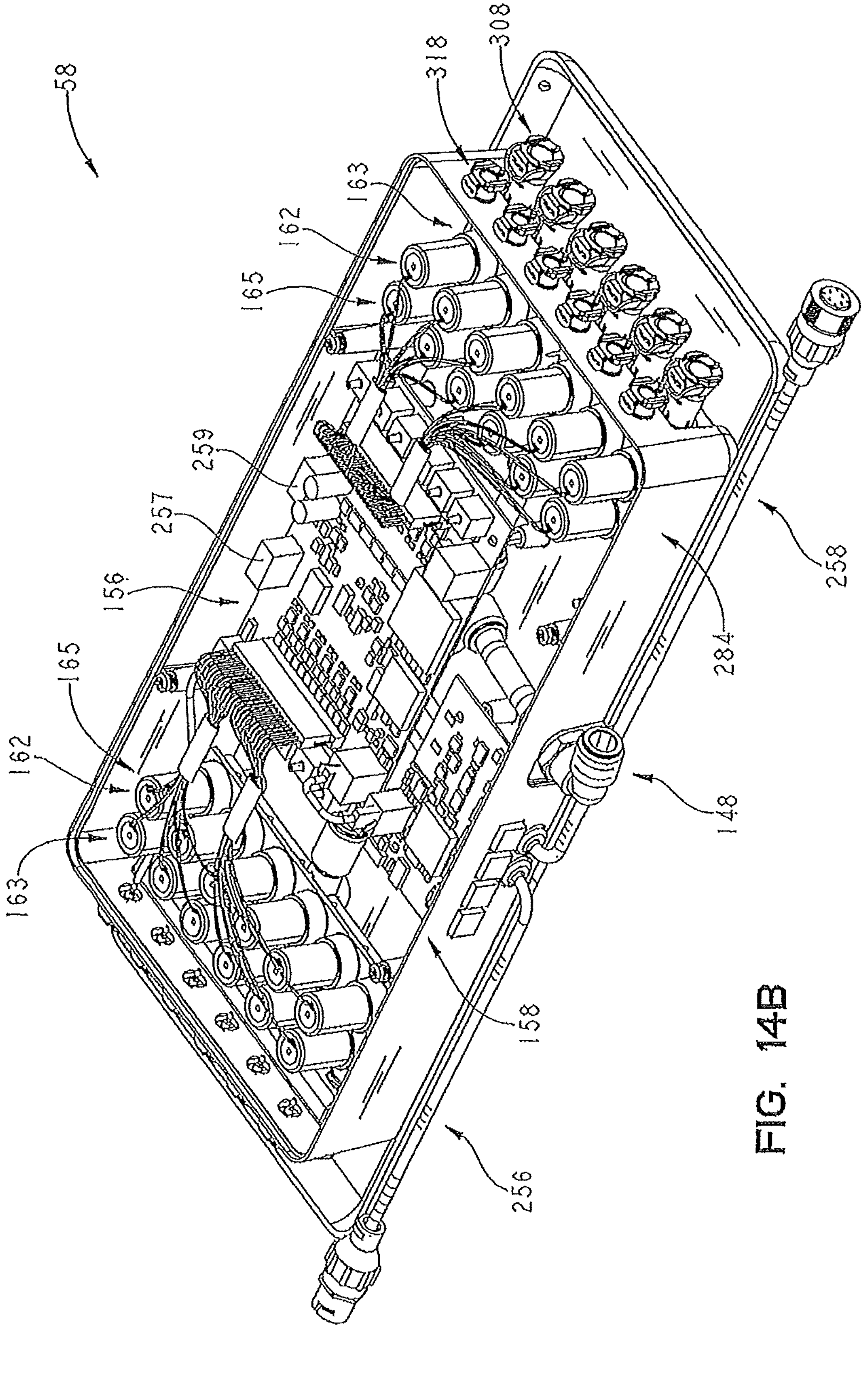
FIG. 14B is a perspective view of the pneumatic assembly of FIG. 14A.

As shown in FIGS. 14A-14B, control box 58 includes a multiplexer 252 and an air control board 250. Control board 250 is coupled to multiplexer 252 by a jumper 254. Multiplexer 252 is further coupled to head sensor pad 68 and seat sensor pad 70 through a signal and control line (not shown). Control board 250 is also coupled to first valve module 156 and second valve module 158 by wire leads 251. A communication/power line 258 couples control board 250 to the control unit 42. Communication line 258 couples to a communication plug 259 of control board 250. Jumper 254 couples multiplexer 252 to control board 250 for power and access to communication line 258. Wire leads 251 provide actuation power to first and second valve modules 156, 158.

As discussed above, first and second valve modules 156, 158 include fill valves 163 and vent valves 165. First valve module 156 includes fill valves 163*a-f* and vent valves 165*a-f*. Second valve module 158 includes fill valves 163*g-l* and vent valves 165*g-l*. Fill valves 163*a-l* and vent valves 165*a-l* are 12 Volt 7 Watt solenoid direct active poppet style valves in the illustrated embodiment. Control board 252 is able to actuate each fill valve 163*a-l* and vent valve 165*a-l* independently or simultaneously. Fill valves 163*a-l* and vent valves 165*a-l* are all able to be operated at the same time. In operation to initiate each valve 163, 165, control board 250 sends a signal to the valve to be operated. The signal causes a coil (not shown) within each valve to energize for ½ second and then switches to pulsate power (i.e., turn on and off at a high rate) to save power during activation. The activation in turn cause the valve to either open or close depending on which valve is initiated.

Fill valves 163 are coupled to air supply 152 of control unit 42 by second air line 148. Air line 148 includes an outer box line assembly 260 and an inner box line assembly 262. Outer box line assembly 260 includes an exterior inlet hose 264 and an elbow 266 coupled to exterior inlet hose 264. Inner box line assembly 262 includes an interior inlet hose 268 coupled to elbow 266, a union tee connector 270, a first module hose 272, and a second module hose 274. Connector 270 includes a first opening 276 to receive interior inlet hose 268, a second opening 278 to receive first module hose 272, and a third opening 280 to receive second module hose 274. First and second module hoses 272, 274 each couple through a male coupler 282 to first and second valve modules 156, 158 respectively. In operation, air from air supply 152 travels through supply line 148, enters outer box line assembly 260 through exterior inlet hose 264 and passes through elbow 266 to interior inlet hose 268. The air then travels from inlet hose 268 to union tee connector 270 where the air is divided into first module hose 272 and second module hose 274. The air passes through first and second module hoses 272, 274 into first and second valve modules 156, 158 respectively. The operation of first and second valve modules 156, 158 is described below.

Control box 58 includes a base 284, a cover 286, and a tray 288. Cover 286 includes a plurality of fasteners (i.e., screws) 290. Base 284 includes a plurality of threaded cover posts 292. Cover posts 292 are configured to receive screws 290 to couple cover 286 to base 284. Cover 286 and base 284 define an inner region 298. Tray 288 couples to base 284 with a plurality of rivets 291 riveted through a plurality of rivet holes 293 located on tray 288 and base 284.

Inner box line assembly 262, first valve module 156, second valve module 158, control board 250, and multiplexer 252 are contained within inner region 298. Base 284 further includes a plurality of control board posts 294, a plurality of multiplexer posts 296, and a plurality of module posts 300. First and second valve modules 156, 158 are coupled to module posts 300 by shoulder screws 302 and washers 304. Control board 250 and multiplexer 252 are respectively coupled to control board posts 294 and multiplexer posts 296 by a plurality of snap mounts 306.

First and second valve modules 156, 158 attach to third air lines 150*a, b, d-f*, and *g-l* through a plurality of couplers 308. Couplers 308 include a first end 310 and a second end 312. Third air lines 150*a, b, d-f*, and *g-l* each include a fitting (not shown) receivable by second end 312. Each first end 310 mounts to a port 314 in first and second valve modules 156, 158. First end 310 mounts through a plurality of openings 316 in base 284.

A plurality of feedback couplers 318 mount through a plurality of feedback openings 320 in base 284. Feedback couplers 318 include a first feedback end 322 and a second feedback end 324. First feedback end 322 couples to a feedback line (not shown) that in turn couples to a feedback port 135 located on each air zone 160. Second feedback end 324 receives a feedback transfer line 326. Each transfer line 326 couples to a pressure transducer 328 located on the control board 250. Pressure transducer 328 receives the pressure from each air zone 160 and transmits to control unit 42 a pressure data signal representing the internal air pressure of the zone 160. Control unit 42 uses these pressure signals to determine the appropriate pressures for certain mattress functions such as CPR, patient transfer, and max-inflate. Pressure signals from the transducer 328 coupled to the foot zone 160*k* are also used to maintain optimal pressure in foot zone 160*k*. In the illustrated embodiment, pressure in foot zone 160*k* (zone 3) is computed as a percentage of the pressure in seat zone 160*e* (zone 2). The pressures in seat zone 160*e* and head zone 160*f* are determined using both the transducers 328 and the pressure sensors 136. The pressures in one or more of the zones 160 maybe adjusted in real time.

As shown in FIG. 13, fill valves 163*a-l* and vent valves 165*a-l* are coupled to various portions of patient support 10 through third air lines 150*a, b, d-f*, and *g-l*. Fill valve 163*a* and vent valve 165*a* are coupled to upper foot bolsters 140*c*, fill valve 163*b* and vent valve 165*b* are coupled to lower side bolsters 142*a, b*, fill valve 163*c* is coupled to atmosphere and vent valve 165*c* is reserved for future therapies. Also, fill valve 163*d* and vent valve 165*d* are coupled to first turn assist 74*a*, fill valve 163*e* and vent valve 165*e* are coupled to seat bladders 62, fill valve 163*f* and vent valve 165*f* are coupled to head bladder assembly 60, fill valve 163*g* and vent valve 165*g* are coupled to foot filler 80, fill valve 163*h* and vent valve 165*h* are coupled to upper side bolsters 140*a, b*, fill valve 163*i* and vent valve 165*i* are coupled to deck filler 90, fill valve 163*j* and vent valve 165*j* are coupled to first turn assist 74*b*, fill valve 163*k* and vent valve 165*k* are coupled to foot bladders 164, fill valve 163*l* and vent valve 165*l* are coupled to lower foot bolsters 142*c*. Vent valves 165*d, j* are biased in the open position to vent air from first and second turn assist 74*a*, 74*b* when first and second turn assist 74*a*, 74*b* are not in use. Vent valves 165*d, j* return to their open position if the mattress loses power or pressure venting air from the first and second turn assist 74*a*, 74*b*. When air is vented from a zone 160, the pressure in the zone 160 after deflation is determined by the control system 42, 58 in real time rather than being predetermined.

In one embodiment, a user enters an input command to control unit 42. Control unit 42 processes the input command and transmits a control signal based on the input command through communication line 258 to control board 250. Additionally or alternatively, control signals could be based on operational information from control unit 42 to increase or decrease pressure within one or more of the zones 160 based on information obtained from transducers 328 and/or sensors 136.

It should be noted that in the illustrated embodiment, the mattress controls 42, 58 are independent from operation of the bed frame 4. In other embodiments, however, bed frame 4 and mattress 10 maybe configured to exchange or share data through communication lines. For instance, data is communicated from bed frame 4 to mattress system 42, 58 and used to adjust support parameters of mattress 10. For instance, in one embodiment, a signal is transmitted from frame 4 when foot section 34 is retracting, so that mattress systems 42, 58 responds by decreasing internal pressure of vertical bladders 50 in foot assembly 64.

As described above, air supply 152 is capable of supplying air or acting as a vacuum to remove air from zones 160. While in supply mode, a microprocessor on control board 250 actuates corresponding fill valve 163*a-l* or vent valve 165*a-l* based on the control signal from control unit 42. For example, if the control signal indicates the pressure in head bladder assembly 160 is to be increased fill valve 163*f* is actuated. However, if the control signal indicates the pressure in head bladder assembly 160 is to be decreased vent valve 165*f* is actuated. While in vacuum mode one or more fill valves 163*a-l* maybe actuated to allow for rapid removal of air within the corresponding zones.

Figure 15:
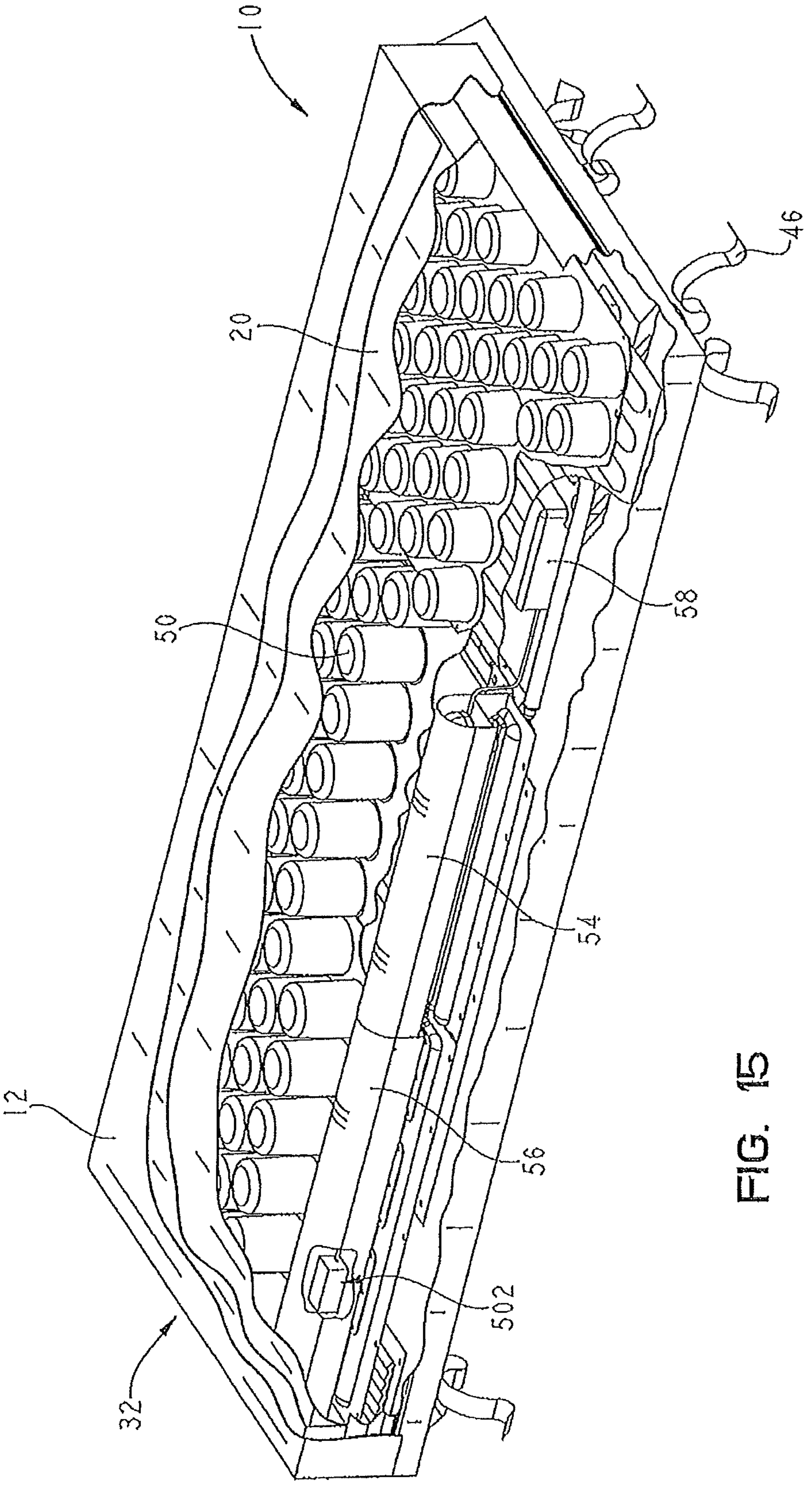
FIG. 15 is a perspective view of a patient support, with a portion being cut away to show interior components, including an angle sensor, of the patient support.

An angle sensor cable 256 is provided to send a signal from a head angle sensor 502 to the control board 250. Angle sensor cable 256 couples to an angle plug 257 of control board 250. In the illustrated embodiment, head angle sensor 502 is located within head bolster assembly 76 as indicated by FIGS. 11A and 15. Head angle sensor 502 indicates the angle of elevation of the head end 32 of bed 2 as the head section of the frame 4 articulates upwardly raising the patient's head or downwardly lowering the patient's head. In one embodiment, angle sensor 502 transmits the angle of head end 32 to all nodes or circuit boards within the mattress control system 42, 58. Angle sensor 502 generates an indication or indicator signal when head end 32 is at an angle of at least 5.degree., at least 30.degree., and at least 45.degree. The head angle indication is transmitted to the control unit 42 which evaluates and processes the signal. When head end 32 is at an angle above 30.degree. turn assist 74 becomes inoperative primarily for patient safety reasons. When head end 32 is at an angle above 45.degree. information is transmitted to control unit 42 for use in the algorithms. The 5.degree. angle indication is primarily to ensure relative flatness of patient support 10. In the illustrated embodiment, angle sensor 502 is a ball switch. In an alternative embodiment, angle sensor 502 maybe a string potentiometer.

Figure 16A:
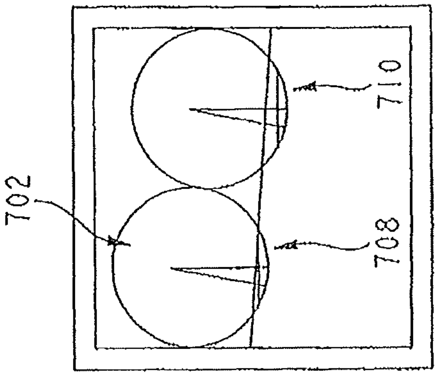
FIGS. 16A-C are diagrammatic views showing ball switches located within the angle sensor.
Figure 16B:
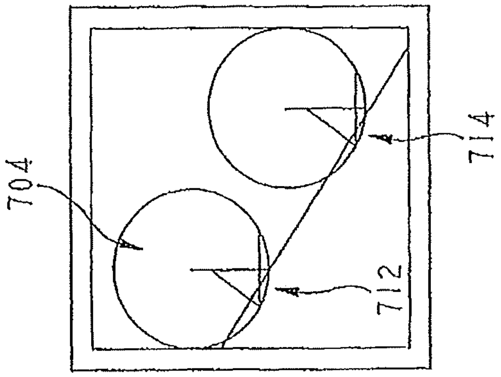
Figure 16C:
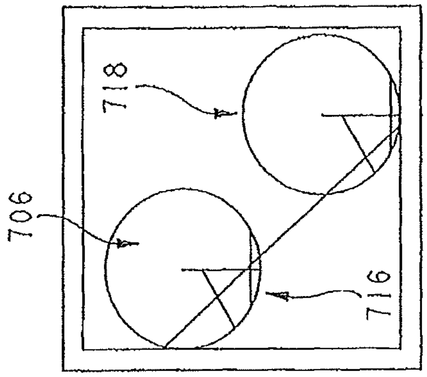

As shown in FIGS. 16A-16C, three balls 702, 704, 706 are provided within angle sensor 502. First ball 702 actuates when the head end 32 is at an angle of at least 5.degree. moving first ball 702 from a first position 708 to a second position 710. Second ball 704 indicates when the head end 32 is at an angle of at least 30.degree. moving second ball 704 from a first position 712 to a second position 714. Third ball 706 indicates when the head end 32 is at an angle of at least 45.degree. moving third ball 706 from a first position 716 to a second position 718.

Figure 17:
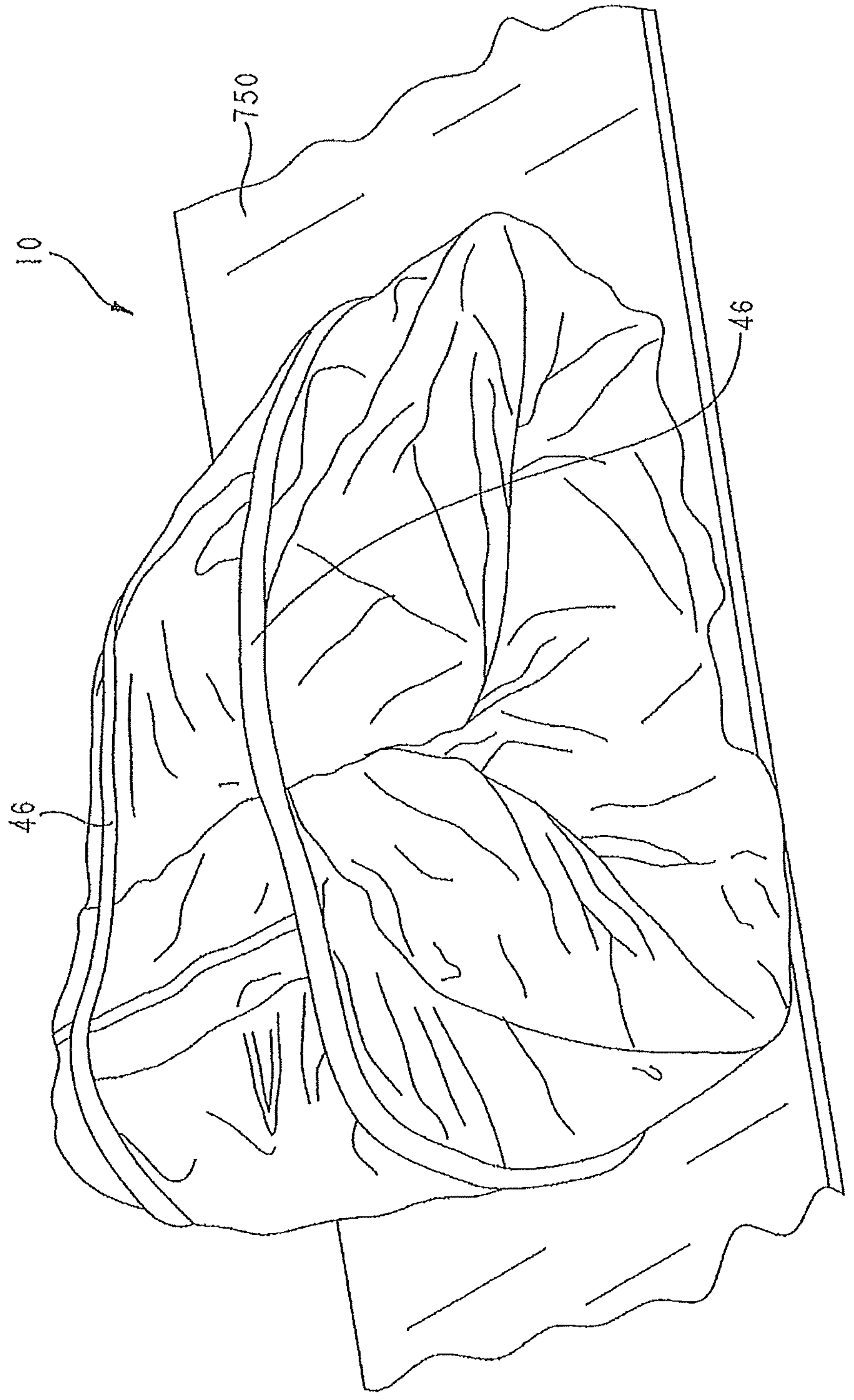
FIG. 17 is a perspective view of the patient support in a transportation position.

FIG. 17 shows patient support 10 in a transportation position on a pallet 750. As discussed above, air supply 42 is capable of providing a vacuum to evacuate the air from within patient support 10. This allows patient support 10 to be folded. As shown in FIG. 17, couplers 46 hold patient support 10 in the transportation position. Support plates 144 are provided as separate plates to aid in the folding process. As patient support 10 is folded, any remaining air not evacuated by the air supply 42 is forced from the patient support 10.

Figure 18:
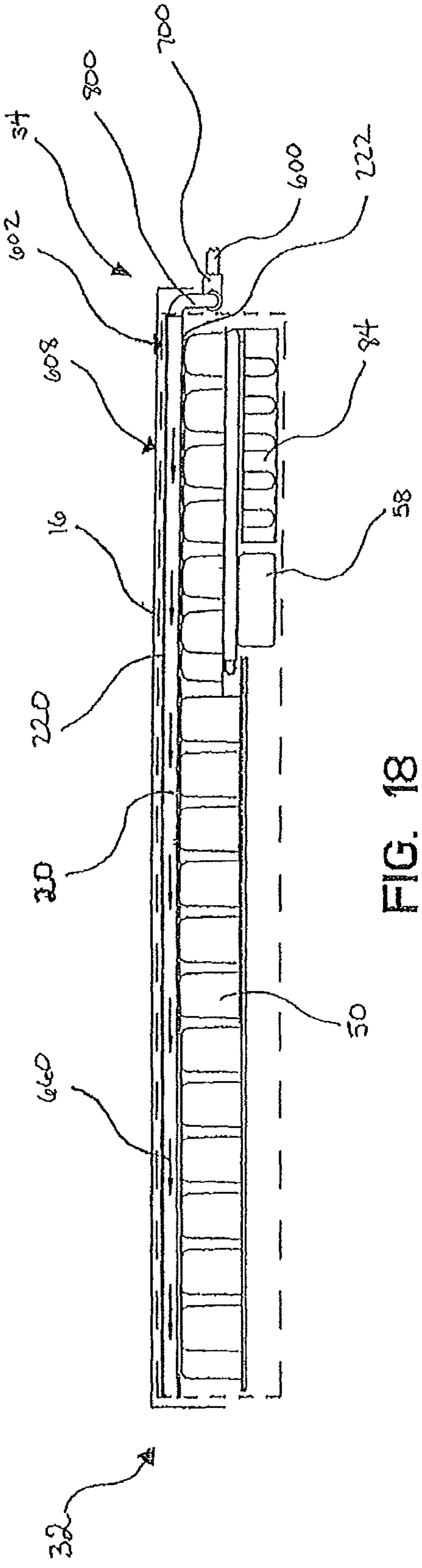
FIG. 18 is a side view of selected components of another embodiment of a patient support.

In FIG. 18, a side view of another embodiment of a patient support 10 is shown with an enclosure 602. Enclosure 602 includes a top surface 608, a fire-resistant material 16 beneath the top surface 608, and a three-dimensional layer 20 beneath the fire-resistant material 16. The three-dimensional layer 20 includes a top membrane layer 220 and a bottom membrane layer 222. The top membrane layer 220 and bottom membrane layer 222 can be impermeable to air and the three-dimensional material 20 can include Spacenet, Tytex, and/or similar material, as disclosed in FIGS. 4 and 9 and corresponding descriptions, for example. One or more inflatable bladders 50 are provided as an additional support layer beneath the bottom membrane layer 222. At the foot end 34 of the patient support 10, a pneumatic box 58 and an additional layer 84, are provided. Layer 84 includes a retractable foam material in the illustrated embodiment.

Figure 19:
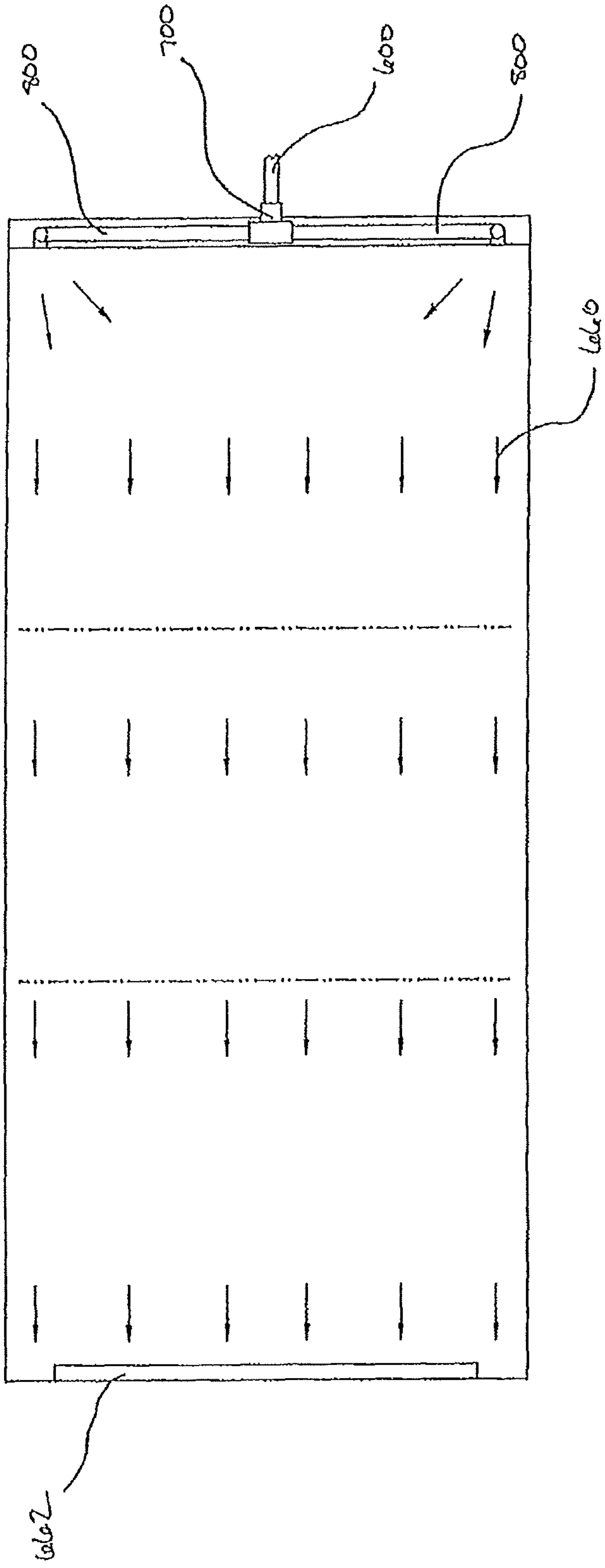
FIG. 19 is a top view showing air flow through the embodiment of the patient support shown in FIG. 18.

As illustrated in FIGS. 18 and 19, air is supplied by an air supply (not shown) through a supply tube 600 located near one end 34 of the patient support 10. The supply tube 600 is coupled to a fitting 700 which also attaches to distributing tubes 800. This arrangement is further shown in FIG. 20 and described below. Air flows through the distributing tubes 800 and into the enclosure 602 in a direction 660 from the one end 34 to the other end 32 of the patient support 10. The air can be released from the enclosure 602 by a vent assembly 662 near the end 32 of the patient support 10. In the illustrated embodiment, air flows from the foot end to the head end of the patient support. In other embodiments, air may flow in the reverse direction or laterally across the patient support.

Figure 20:
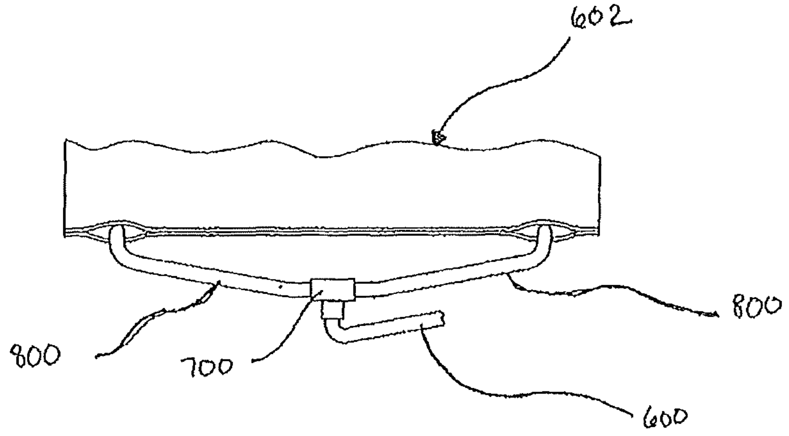
FIG. 20 is a simplified schematic view of a supply tube attaching to an enclosure through a T-fitting.

In FIG. 20, another embodiment for supplying air to the enclosure 602 is shown including a supply tube 600, fitting 700, and distributing tubes 800. Air is received by a supply tube 600 and is transported into distributing tubes 800. The supply tube 600 and distributing tubes 800 are attached by a fitting 700. The fitting 700 can be a T-fitting, as shown in FIG. 20, or any other type of suitable fitting known in the art. Air flows through the distributing tubes 800 and into the enclosure 602.

Figure 21:
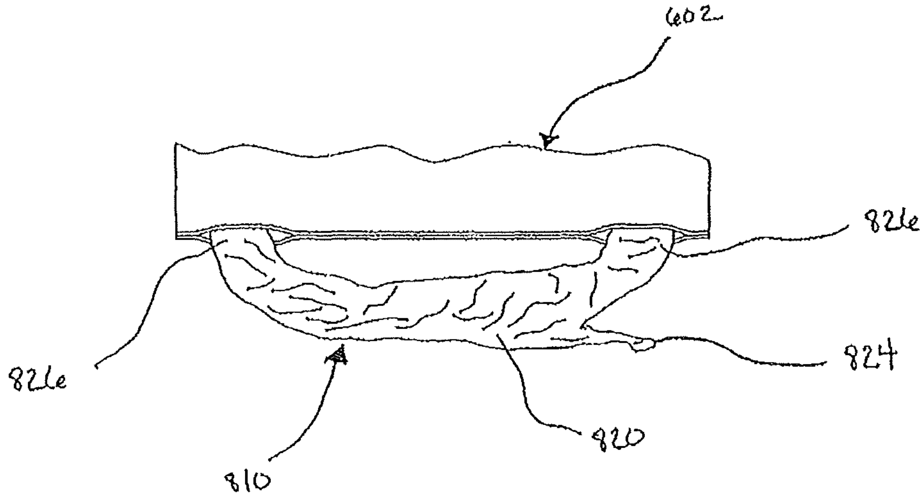
FIG. 21 is a simplified schematic view of a cloth manifold attaching to an enclosure.
Figure 22:
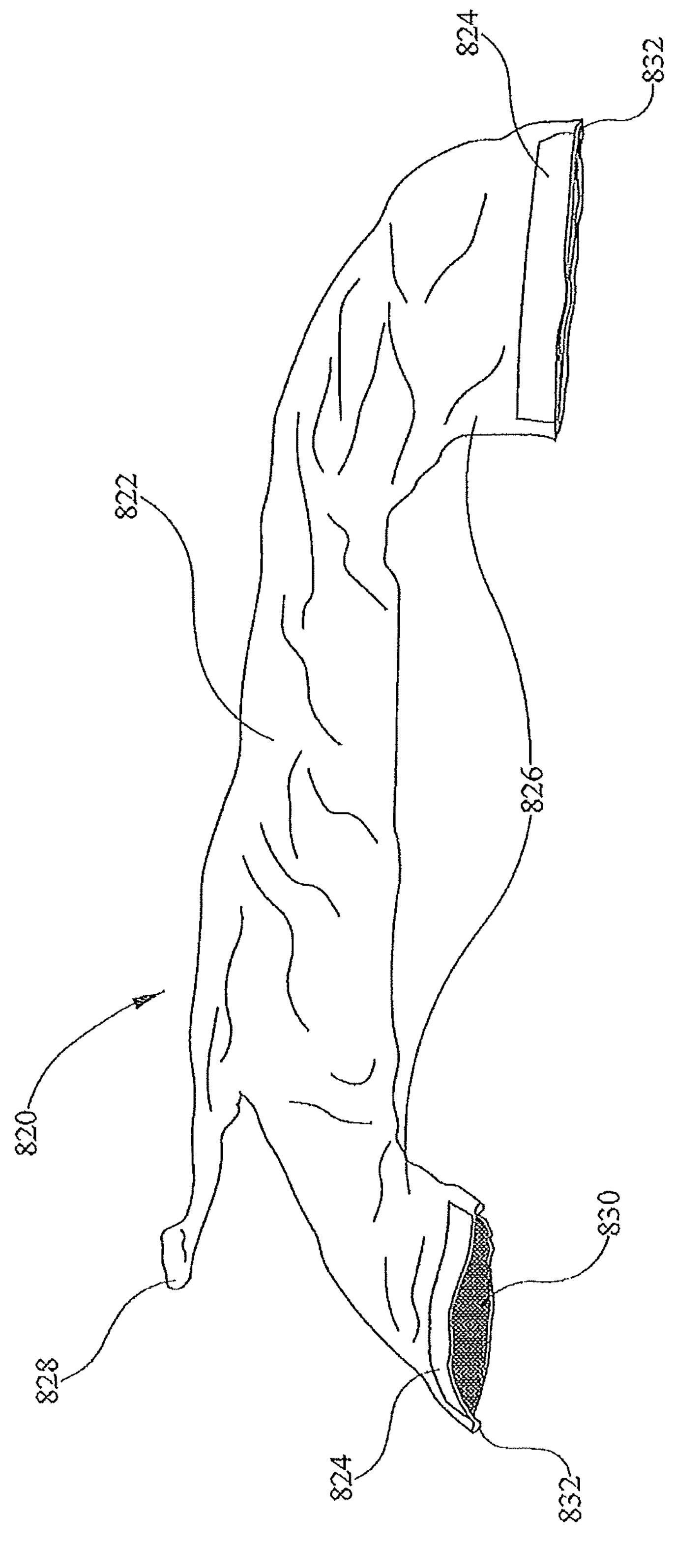
FIG. 22 is a simplified schematic view of various layers of a cloth manifold.

Another embodiment of the supply tube 600, fitting 700, and distributing tubes 800 arrangement is shown in FIGS. 21 and 22 including a cloth manifold arrangement 810. The cloth manifold arrangement 810 includes a cloth manifold 820 made of an outer layer material 822 that can be impermeable to air. The cloth manifold 820 is a soft material that provides additional comfort to the patient and includes a receiving portion 824 and a plurality of distributing portions 826. The receiving portion 824 can attach to a flow tube (not shown) or directly to an air supply (not shown). The distributing portions 826 are coupled to the enclosure 602 by one or more Velcro®-brand strips or similar fasteners 828. The distributing portions 826 may also include hollow receiving apertures 832 used for additional fastening the distributing portions 826 to the enclosure 602. The cloth manifold 820 may include an inner layer 830, as shown in FIG. 22, made from three-dimensional material 20 such as Spacenet, Tytex, and/or similar material as described above.

The inner layer 830 may be configured to help prevent the cloth manifold 820 from kinking or collapsing which may cut off or reduce the air supply to the enclosure 602.

Figure 23:
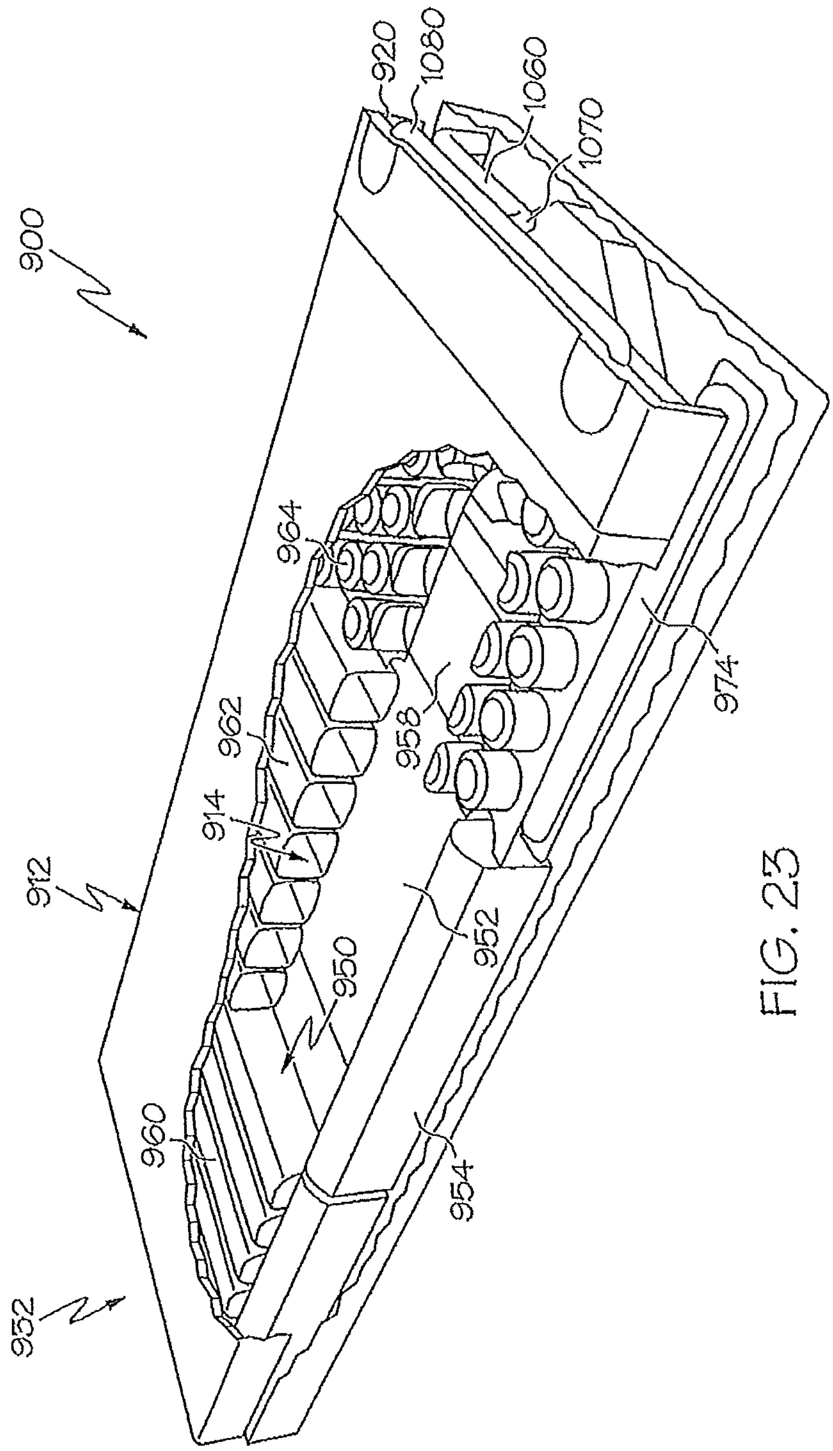
FIG. 23 is a perspective view of another embodiment of a patient support in accordance with the present invention, with portions cut away to show interior components.
Figure 24:
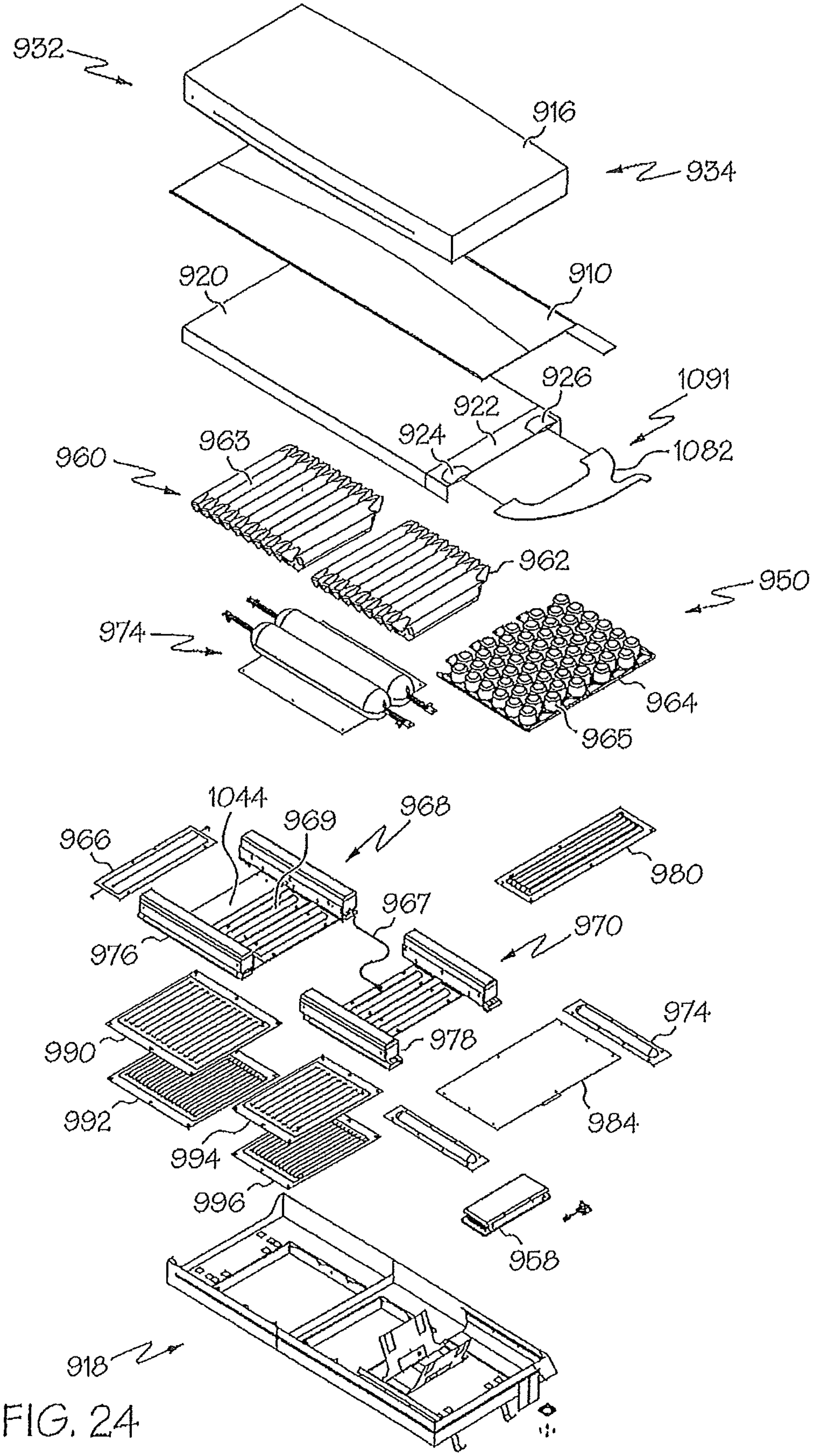
FIG. 24 is an exploded perspective view of another embodiment of a patient support in accordance with the present invention.

Referring now to FIGS. 23 and 24, another embodiment of a patient support 900 has a head end 932 generally configured to support a patient's head and/or upper body region, and a foot end 934 generally configured to support a patient's feet and/or lower body region. Patient support 900 includes a cover 912 which defines an interior region 914. In the illustrated embodiment, interior region 914 includes a first layer 920, a second layer 950, and a third layer 952.

In the illustrated embodiment, first layer 920 includes an air permeable support material, second layer 950 includes a plurality of inflatable bladders located underneath the first layer 920, and third layer 952 includes a pressure sensing assembly located underneath one or more of the bladders of second layer 950. Patient support 900 may be coupled to a deck 6 by one or more couplers 46 as described above.

Components of patient support 900 are shown in exploded view in FIG. 24. Patient support 900 includes a top cover portion 916 and a bottom cover portion 918. Top cover portion 916 and bottom cover portion 918 couple together by conventional means (such as zipper, Velcro® strips, snaps, buttons, or other suitable fastener) to form cover 912, which defines interior region 914.

A fire barrier 910 such as Ventex is located underneath coverlet assembly 916. A first support layer 920 is located below top cover portion 916 in interior region 914. First support layer 920 includes one or more layers of an air permeable three-dimensional material encased in Lycra® or similar material. Suitable three-dimensional materials include Spacenet, Tytex, and/or similar materials. In the illustrated embodiment, layer 920 includes a combination of a three-dimensional polyester spacer fabric and a polyester spring fabric such as Spacenet. In one embodiment, one layer of spacer fabric and four layers of Spacenet are provided. In one embodiment, the Spacenet layers are positioned beneath the spacer fabric.

A second support layer 950 including one or more inflatable bladder assemblies, is located underneath the first support layer 920. The illustrated embodiment of the second support layer 950 includes first, second and third bladder assemblies, namely, a head section bladder assembly 960, a seat section bladder assembly 962, and a foot section bladder assembly 964. First bladder assembly 960 and second bladder assembly 962 include transverse or log shaped bladders 963. Bladders 963 may be coupled together by an integrated base such that they may be removable together as a zone. Bladders 963 may also be individually removable. Communication of fluid to/or from the bladders 963 may be provided by a plenum and ports provided for each mattress zone or by separate ports provided for each bladder. Third bladder assembly 964 includes upright can- or cylinder-shaped bladders 965 as described above. In this embodiment, bladder assemblies 960, 962, 964 are formed from a polyurethane coated nylon twill.

A pressure-sensing layer 969 including first and second sensing assemblies, namely a head sensor assembly 968 and a seat sensor assembly 970, is positioned beneath bladder assemblies 960 and 962. Head sensor assembly 968 is generally aligned underneath head section bladder assembly 960, and seat sensor assembly 970, is generally aligned underneath seat section bladder assembly 962. An additional sensing assembly may also be provided in the foot section of the patient support and data therefrom may be used to determine whether to adjust pressure in one or more of the mattress bladders or to activate or deactivate mattress features or therapies.

Figure 25:
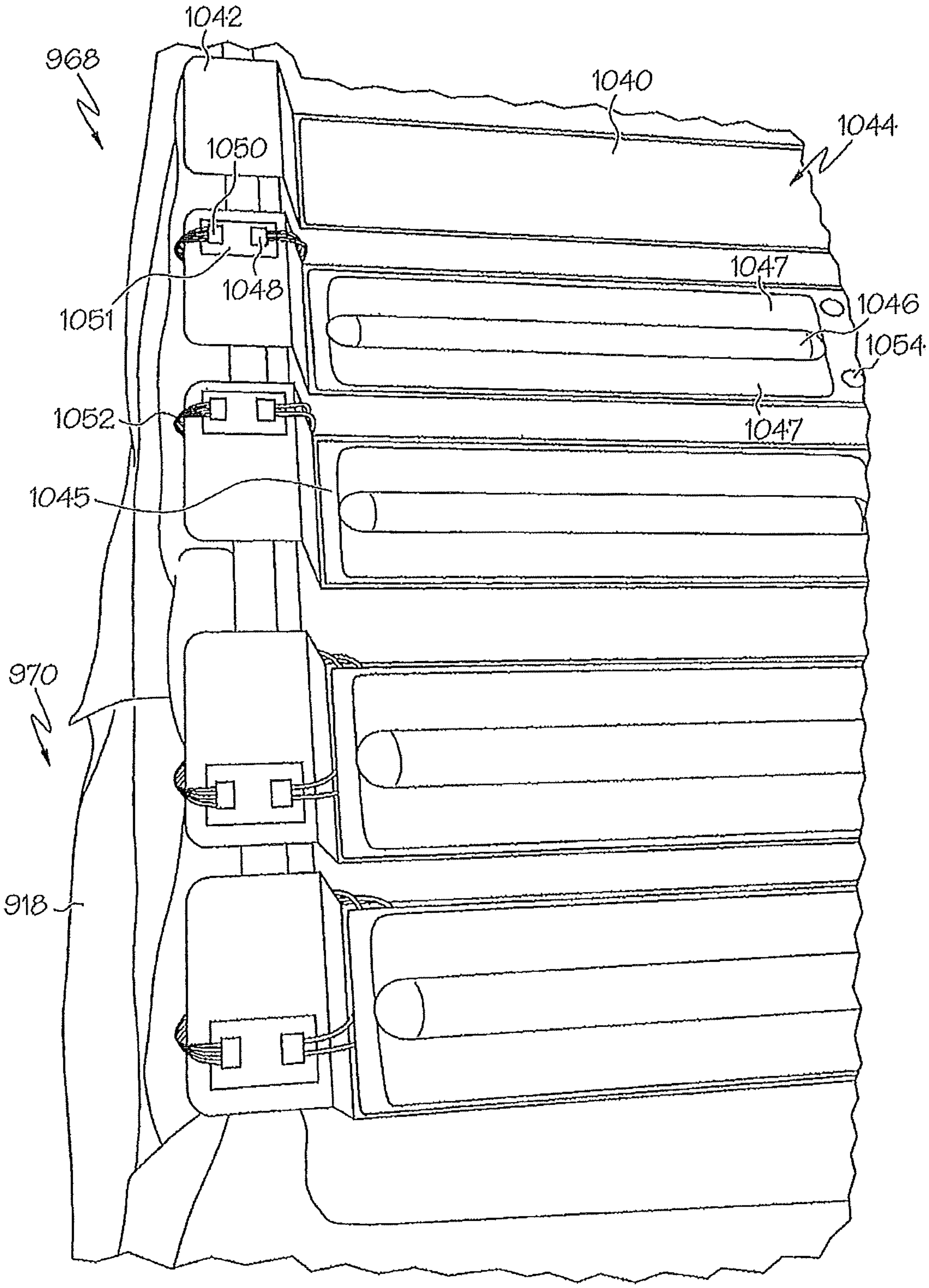
FIG. 25 is a top view of components of a patient support according to the embodiment of FIG. 23.

Each sensor assembly 968, 970 includes two bladder pads 1045 and associated electronics and circuitry, as shown in FIG. 25. A cable 967 connects each pad to the valve box 958. In the illustrated embodiment, portions of the bladders pads 1045 are substantially equal in size. Head end filler 966 may be positioned adjacent head sensor assembly 968 near head end 932 so as to position head sensor assembly 968 underneath the region of patient support 900 most likely to support the head or upper body section of the patient.

In the illustrated embodiment, sensing assemblies 968 and 970 are supported by bolster assemblies 976, 978, respectively, as shown in FIG. 25. Bladder pads 1045 are secured to plates 1044 by couplers 1054. Each bladder pad 1045 includes one or more fluid-filled bladders 1046, a pressure transducer 1048 and associated circuitry. The structure and operation of sensing assemblies 968, 970 is similar to that described in U.S. Pat. No. 6,094,762, assigned to Hill-Rom Industries S.A. of France, which is incorporated herein by reference.

In the illustrated embodiment, each bladder assembly 1045 includes a fluid-filled bladder located between a pair of support members or "wings" 1047. The fluid-filled bladder 1046 and associated wings 1047 extend transversely across the width of the patient support 900 and are supported by a middle section 1040 of the support plate 1044. Bladder 1046 is filled with a silicone oil or gel. Wings 1047 are made of the same material as the bladder 1046 and are configured to secure the bladder 1046 in place. A corresponding circuit board 1051 for each of the bladder pads 1045 is supported by an outer edge section 1042 of the support plate. Circuit boards 1051 are thus positioned below the bolsters 976, 978 and above the plates 1044. A pressure transducer 1048 and a connector 1050 are provided on each circuit board 1051. The pressure transducer 1048 measures fluid pressure in the associated fluid filled bladders 1046, and transmits pressure signals to a pressure sensor hub board 1252 (FIG. 26) via connector 1050 and lines 1052. Valve box 958 interfaces with a control unit 1542 (FIG. 27) to adjust pressure in bladder assemblies 960, 962, 964 based on signals generated by sensors 968, 970 in a similar manner as described above with reference to FIGS. 11A-11B. Pressure in the foot bolster bladders may also be adjusted based on signals generated by one or more of pressure sensing assemblies 968, 970. In addition, signals generated by pressure sensing assemblies 968, 970 may be used to control or moderate operation of the low air loss device 1091 of first layer 920. In some embodiments, a strain gauge based sensor is used in place of the fluid-filled sensor described above.

Referring back to FIG. 24, in the illustrated embodiment, a turn-assist cushion or turning bladder or rotational bladder 974 is located above sensing assemblies 968, 970. The exemplary turn-assist cushion 974 includes a pair of longitudinally oriented inflatable bladders **974*a*, 974*b***.

A plurality of other support components 966, 974, 980, 984, 990, 992, 994, 996 are also provided in the embodiment of FIG. 24. One or more of these support components are provided to enable patient support 900 to be used in connection with a variety of different bed frames, in particular, a variety of bed frames having different deck configurations. One or more of these support components maybe selectively inflated or deflated or added to or removed from patient support 900 in order to conform patient support 900 to a particular deck configuration, such as a step or recessed deck or a flat deck.

The support components illustrated in FIG. 24 are made of foam, inflatable bladders, three-dimensional material, other suitable support material, or a combination of these as shown. For example, as illustrated, fillers 966, 974, 980, 990, 992, 994, 996 include inflatable bladders. Filler portion 984 includes a foam layer positioned substantially underneath the foot section 964.

Also provided in the illustrated embodiment is a pneumatic valve box 958. In the illustrated embodiment, receptacle 958 is removably secured to bottom cover portion 918. Pneumatic box 958 is described below with reference to FIGS. 26-27.

The low air loss device 1091 moves air through the layer 920, typically at about 2 to 10 cubic feet per minute. In general, low air loss devices are designed to aid in controlling the moisture level and the temperature of the patient.

In the embodiment of FIG. 23, a delivery tube 1092 includes tube components 1060, 1070, 1080. Tube assembly 1092 is connected to an air supply and provides air to layer 920. Components of tube assembly 1092 may be made of a lightweight air impermeable material such as plastic.

In the embodiment of FIG. 24, a cloth manifold 1082 is provided in place of tube assembly 1092. Low air loss supply manifold 1082 is substantially as shown and described above with reference to FIG. 22.

Figure 26:
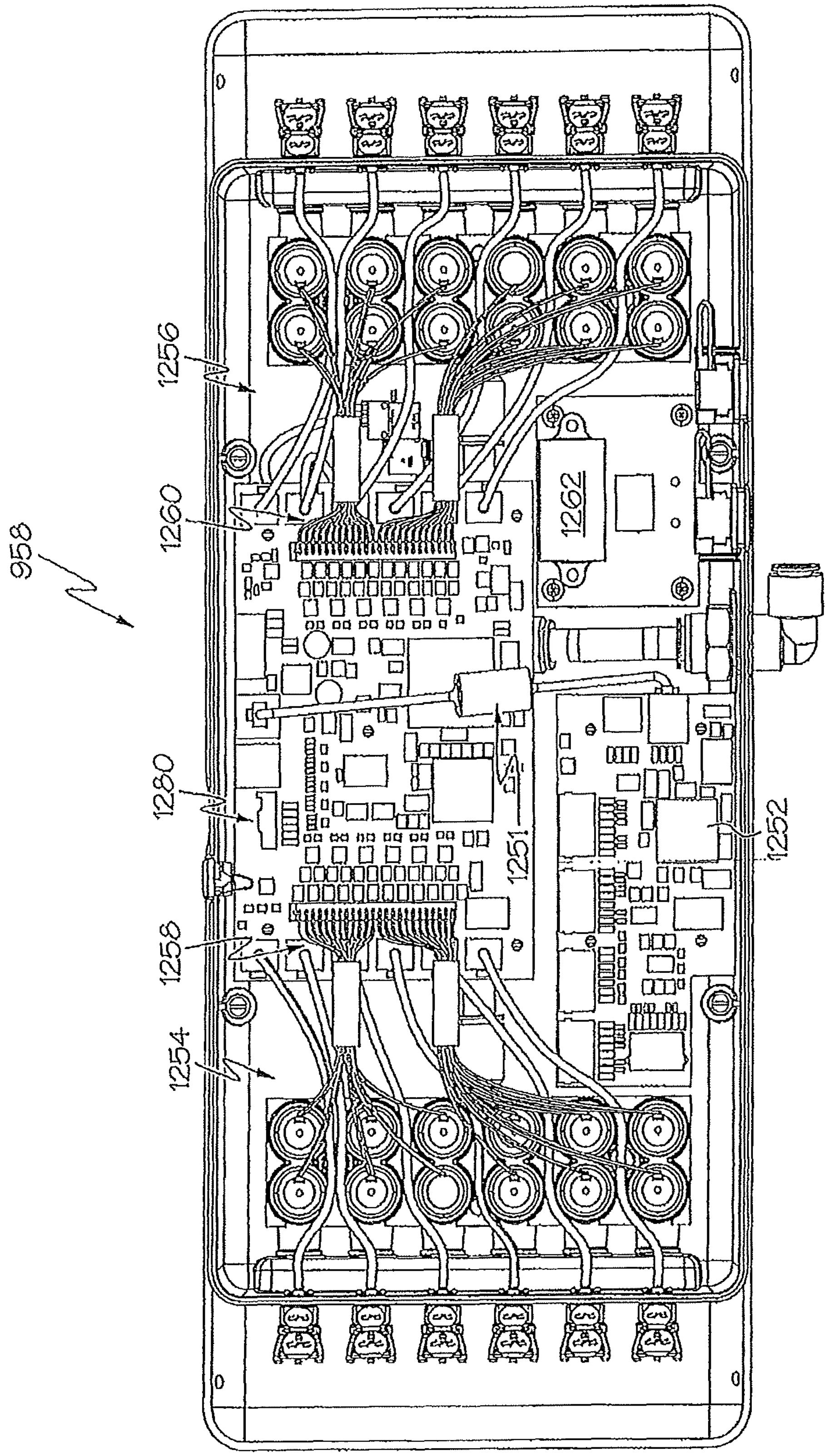
FIG. 26 is top view of an embodiment of a pneumatic assembly according to the embodiment of the patient support of FIG. 23.

FIG. 26 is a simplified top view of a pneumatic valve box assembly 958 configured for use in connection with pressure sensing assemblies 968, 970. Control box 958 includes a sensor hub board 1252 and an air control board 1250. Air control board 1250 is coupled to sensor hub 1252 by a connector 1251. Sensor hub 1252 is further coupled to sensing assemblies 968, 970 through signal and control lines (not shown). Air control board 1250 is also coupled to first valve module 1254 and second valve module 1256 by wire leads 1258, 1260. A communication/power line 1518 couples control board 1250 to a control unit 1542. Pneumatic assembly 958 is otherwise generally similar in structure and operation to the embodiment shown and described with reference to FIGS. 14A-14B.

Figure 27:
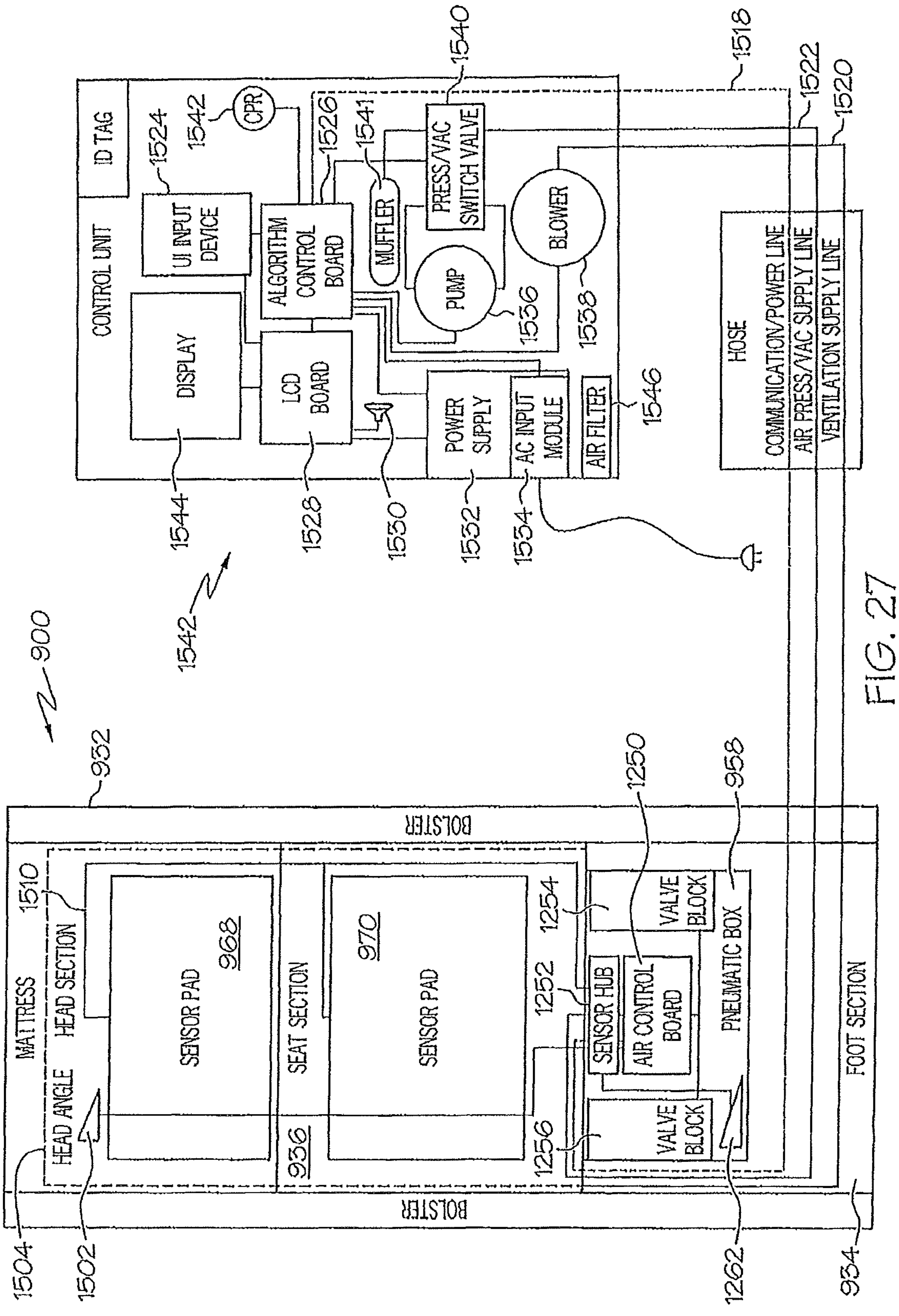
FIG. 27 is a simplified block diagram of the pneumatic assembly according to the embodiment of the patient support of FIG. 23.

FIG. 27 is a simplified schematic diagram of a control system 1542 and related components of the patient support or mattress 900 in accordance with the present invention. The patient support 900 includes a sensor assembly 952 which is coupled to the pneumatic valve control box 958 as previously described. The sensor assembly 952 includes a head sensor assembly 968 and a seat sensor assembly 970. The head sensor assembly 968 is located at the head end 932 of the mattress 900. The seat sensor pad 970 is located at a middle portion or seat section 936 of the mattress 900, which is located between the head end 932 and a location of the pneumatic valve control box 958. The seat sensor pad 970 is located such that a patient laying upon the mattress 900 may generally have its middle portion or seat portion positioned above the pad 970. In addition, when the head end 932 of the mattress 900 is elevated, the seat portion of the patient is generally positioned above the seat sensor pad 970. As previously described with respect to FIG. 23, the head sensor pad 968 is located beneath the head section bladder assembly 960 and the seat sensor pad 970 is located beneath the seat section bladder assembly 962. Other embodiments may include a greater or lesser number of sensor assemblies and/or sensor pads.

Head angle sensor 1502 and foot angle sensor 1262 are coupled to the control box 958 whereby signals from the sensor 1502 provide head angle information for adjusting pressure in one or more of the bladder zones 960, 962, 964. As shown in the illustrated embodiment, head angle sensor 1502 is located within the interior region of the head section of the mattress 900, and foot angle sensor 1262 is located within the interior region of the foot section of the mattress 900. Foot angle sensor 1262 is further located within the control box 958 within the interior region of the mattress 900.

The sensor assembly 952 is coupled through the associated cabling to the pneumatic control box 958. The pneumatic control box 958 includes the sensor hub board 1252 coupled to the head sensor assembly 968 and the seat sensor pad 970 through a signal and control line 1510. The sensor hub board 1252 is also coupled to an air control board 1250 which is in turn coupled to a first valve block 1254 and a second valve block 1256. A communication/power line 1518 is coupled to the control unit 1542. Likewise, a ventilation or low air loss supply line 1520, 1504, is also coupled to the control unit 1542. An air pressure/vacuum supply line 1522 is coupled to the control unit 1542 as well.

The control unit 1542 is similar to that shown and described above. In general, mattress 900 uses serial communication and a Controller Area Network (CAN) communication protocol along with a CAN open-based application layer for communication between the various modules of the mattress system. A “masterless” system (as opposed to a “master-slave” system) is used. Signals are transmitted across the network from sensors and other components to the algorithm control unit, which then activates or deactivates components based on its processing of the signals and sends corresponding control signals out across the network, for example to activate or deactivate the air supply or blower or open or close certain valves.

Control unit 1542 includes a display 1544, which displays user interface screens, and a touch screen user interface input device 1524 for inputting to the control unit 1542 user selectable information, such as the selection of various functions or features of the present device. The selections made on the user interface input device 1524 control the operation of the patient support 900, which can include selectable pressure control of various bladders within the mattress 900, as well as displaying the current state of the mattress or its position, and other features.

In the illustrated embodiment of the control unit 1542, an algorithm control board 1526 is coupled to the user interface input device 1524. The algorithm control board 1526 receives user generated input signals received through the input device 1524 upon the selection of such functions by the user. The input device 1524 can include a variety of input devices, such as pressure activated push buttons, a touch screen, as well as voice activated or other device selectable inputs. The algorithm control board 1526 upon receipt of the various control signals through the user input device 1524 controls the operation of the mattress 900 and a variety of other devices which are incorporated into the control unit 1542. For instance, the algorithm control board 1526 is coupled to a display board 528 which sends signals to the display 1544 to which it is coupled. The display board 528 is also connected to a speaker 1530 which generates audible signals which might indicate the selection of various features at the input device 1524 or indicate a status of a patient positioned on patient support (e.g. exiting) or indicate a status of therapy being provided to the patient (e.g., rotational therapy complete) or indicate a status or condition of the mattress itself. The algorithm control board 1526 receives the required power from power supply 1532 which includes an AC input module 1534, typically coupled to a wall outlet within a hospital room.

The algorithm control board 1526 is coupled to an air supply, which, in the illustrated embodiment includes a compressor 1536 and a blower 1538. Both the compressor 1536 and the blower 1538 receive control signals generated by the algorithm control board 1526. The compressor 1536 is used to inflate the air bladders. The blower 1538 is used for low air loss air circulation which is provided through the ventilation supply line 1520, 1504 to the mattress 900. It is, however, possible that the compressor 1536 may be used to both inflate the bladders and to circulate the air within the mattress 900. A pressure/vacuum switch valve 1540 is coupled to the compressor 1536 which is switched to provide for the application of air pressure or a vacuum to the mattress 900. A muffler 1541 is coupled to the valve 1540. In the pressure position, air pressure is applied to the mattress 900 to inflate the mattress for support of the patient. In the vacuum position, the valve 1540 is used to apply a vacuum to the bladders therein such that the mattress maybe placed in a collapsed state for moving to another location or for providing a CPR function, for example. A CPR button 1542 is coupled to the algorithm control board 1526.

As illustrated, the algorithm control board 1526, the compressor 1536, the blower 1538, and the user input device or user control module 1524 are located externally to the mattress and are a part of the control unit 1542, which may be located on the footboard 38 as shown in FIG. 1. The sensors 952 or portions thereof, the pneumatic valve control box 958, and the air control board or microprocessor 1250 for controlling the valves are located within the mattress 900. It is within the present scope of the invention to locate some of these devices within different sections of the overall system, for instance, such that the algorithm control board 1526 could be located within the mattress 900 or the air control board 1250 could be located within the control unit 1542.

Figure 28:
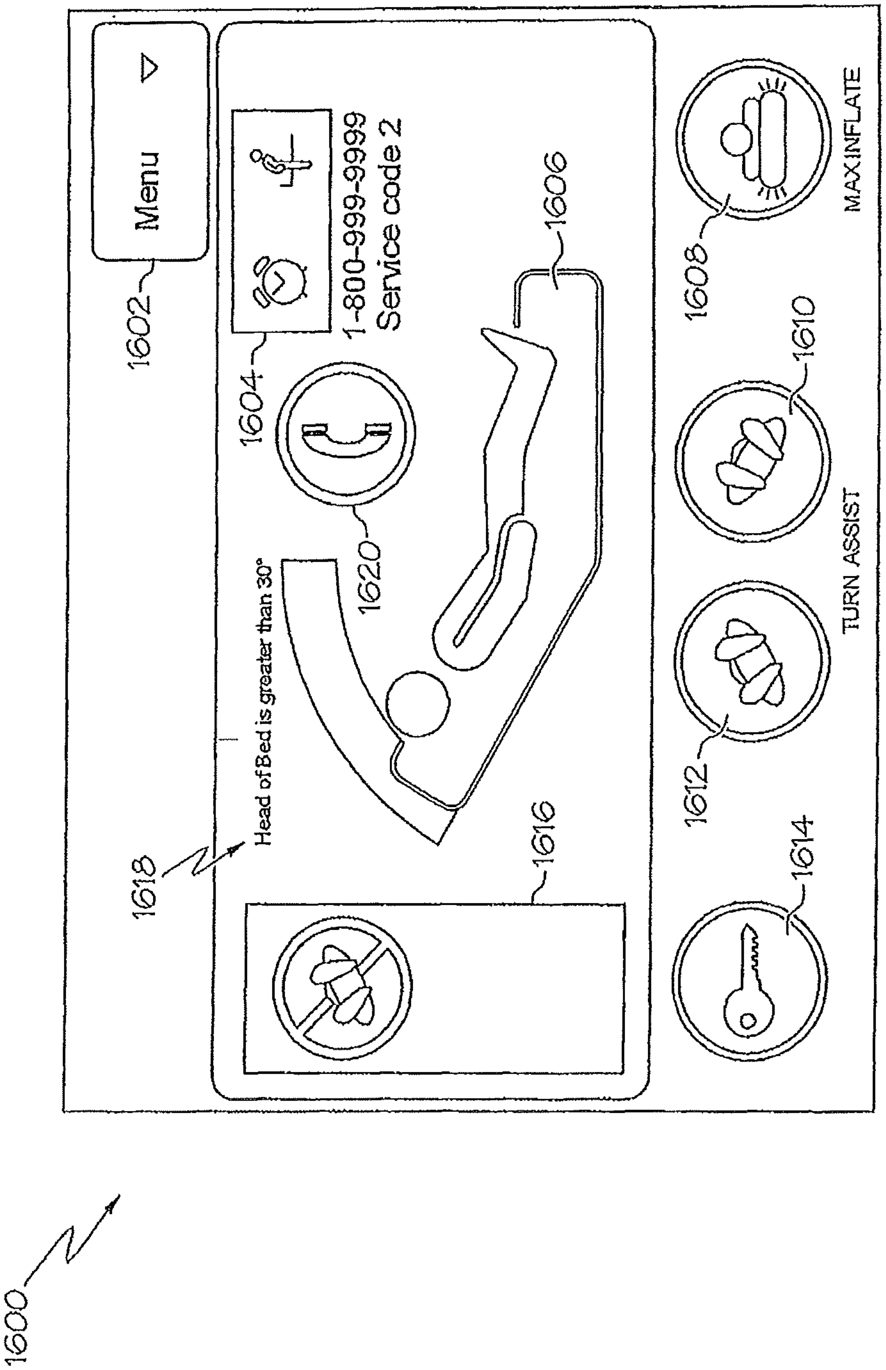
FIG. 28 is an exemplary graphical display of a main menu control screen for a patient support according to the present invention.

As describe above, control unit 1542 provides a graphical display by which an authorized person, such as a caregiver or technician, may interact with the patient support 900. FIG. 28 shows a main screen 1600 for user interaction with the patient support 900. Main screen 1600 includes graphical functional areas 1602, 1604, 1606, 1608, 1610, 1612, 1614, 1616, 1618. Menu button 1602 when activated provides the user with access to addition graphical interaction screens to configure various features of the patient support 900. Alarm status window 1604 is a graphical display indicating whether any alarms have been set. For example, an alarm clock graphic may be shown if a turn reminder alarm feature (described below) is active, and a graphical depiction of a person standing next to a bed may be shown if a bed exit alarm feature (described below) is active. If no such features are active, the graphical display icons may be grayed out or not shown at all.

Bed icon 1606 graphically depicts the current status of the mattress 900. For example, icon 1606 changes as the head angle or foot angle of the mattress 900 changes from the horizontal position. A graphical depiction of a person appears if the mattress is occupied. Buttons 1608, 1610, 1612 activate or deactivate the max-inflate or turn-assist mattress therapies. Enable key 1614 locks or unlocks other buttons on the interactive display. Display area 1616 indicates mattress features that are currently unavailable. For example, if the head angle of the mattress is greater than 30.degree., turn assist buttons 1610, 1612 will be disabled. If no features are currently disabled, no icons will be shown in display are 1616.

Graphical indication 1618 is shown on display 1600 if the head angle of the mattress 900 is greater than 30.degree. and the mattress is occupied. Notification 1620 includes a graphical symbol such as a depiction of a telephone receiver, when an error condition is detected in the mattress. If the mattress is operating without any error conditions, icon 1622 will not be shown. An indication of a telephone number to call and an error code may also be displayed when the icon 1622 is displayed.

FIGS. 29A-D are a simplified depiction of the flow of user interaction through various interactive screens of display 1600. Many of these features have been described in PCT application No. PCT/US06/26788 filed Jul. 7, 2006, which is incorporated herein by reference.

Figure 29A:
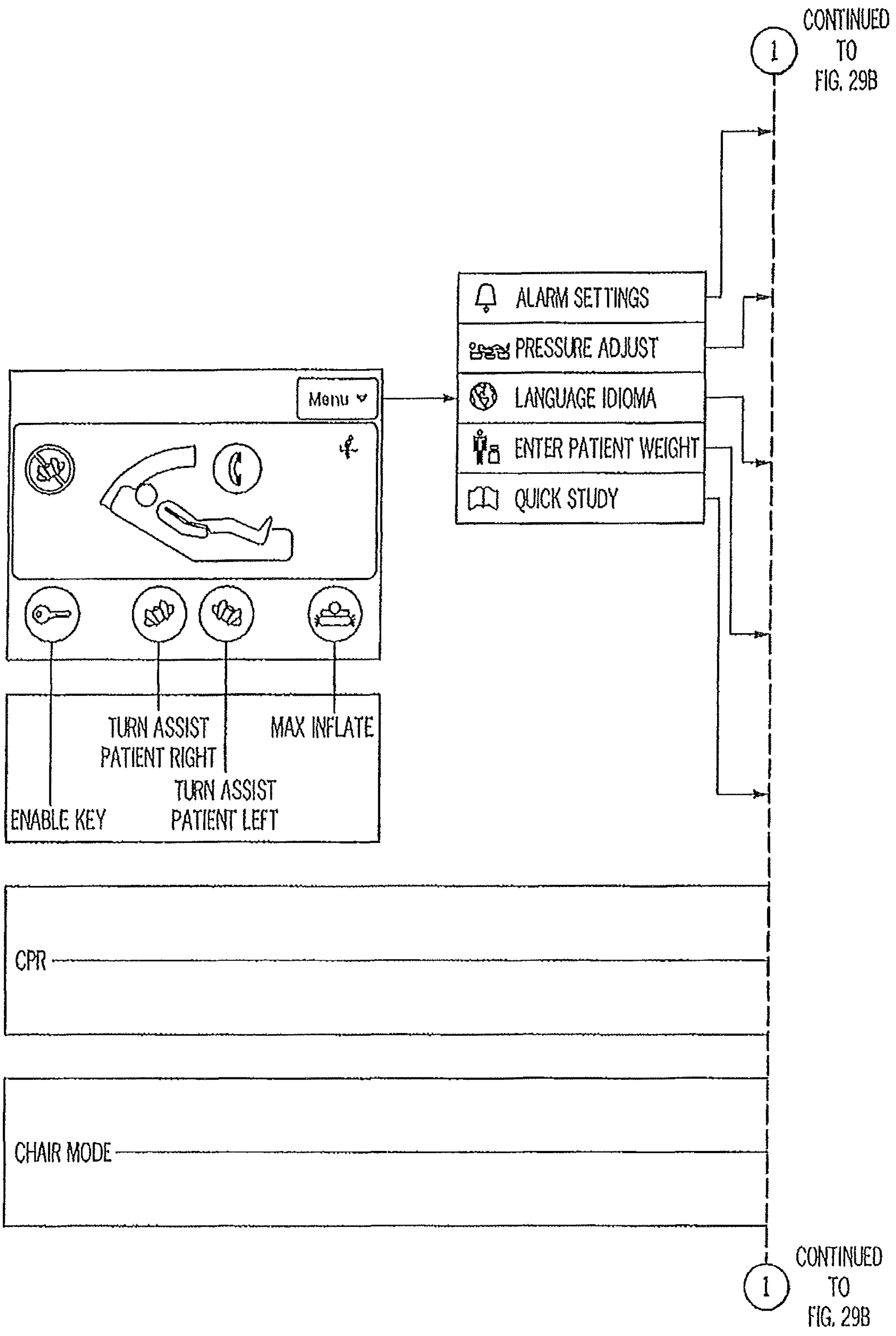
FIG. 29 A-D are a simplified menu flow diagram illustrating options for user interaction with a patient support according to the present invention.
Figure 29B:
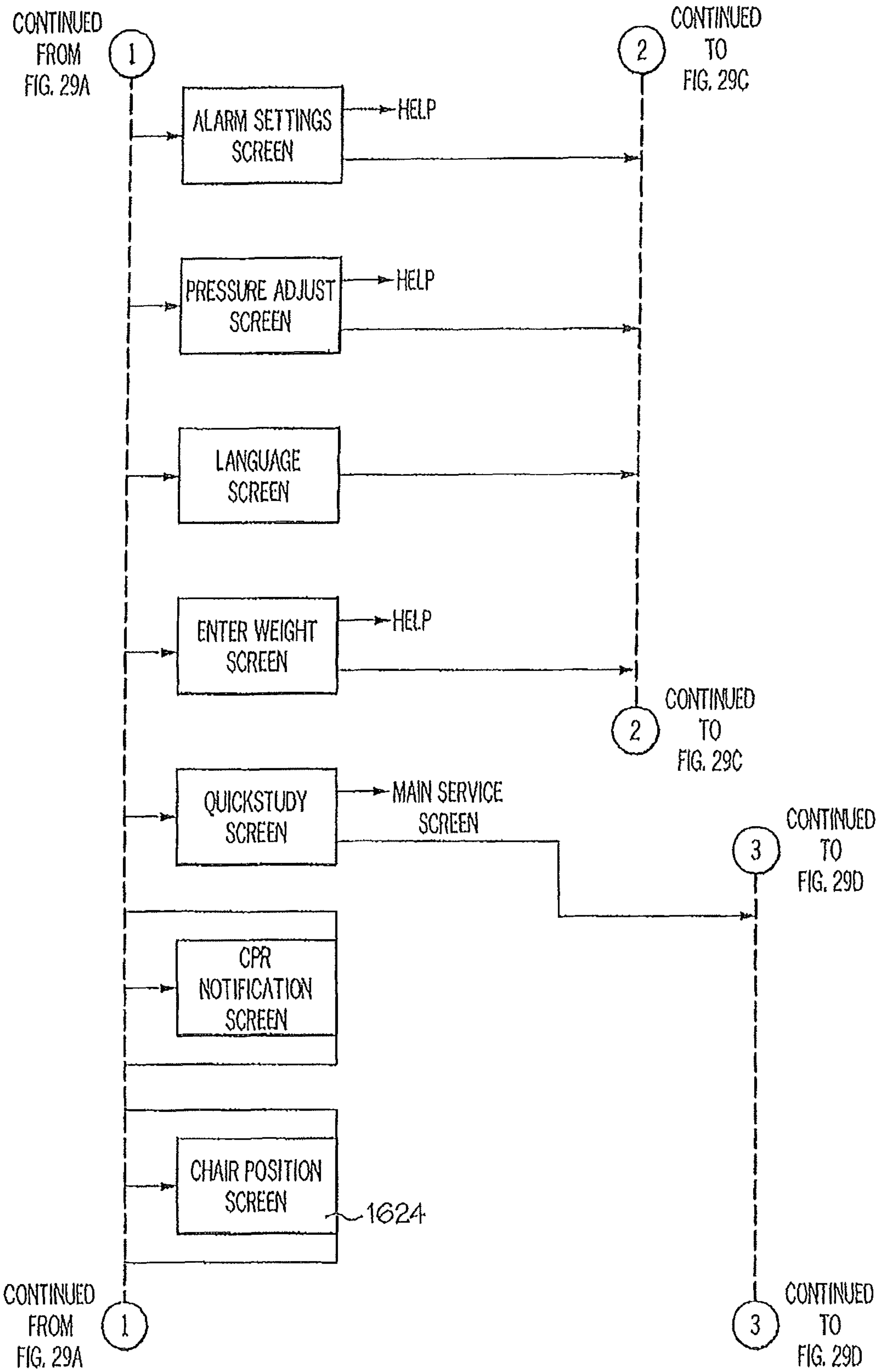
Figure 29C:
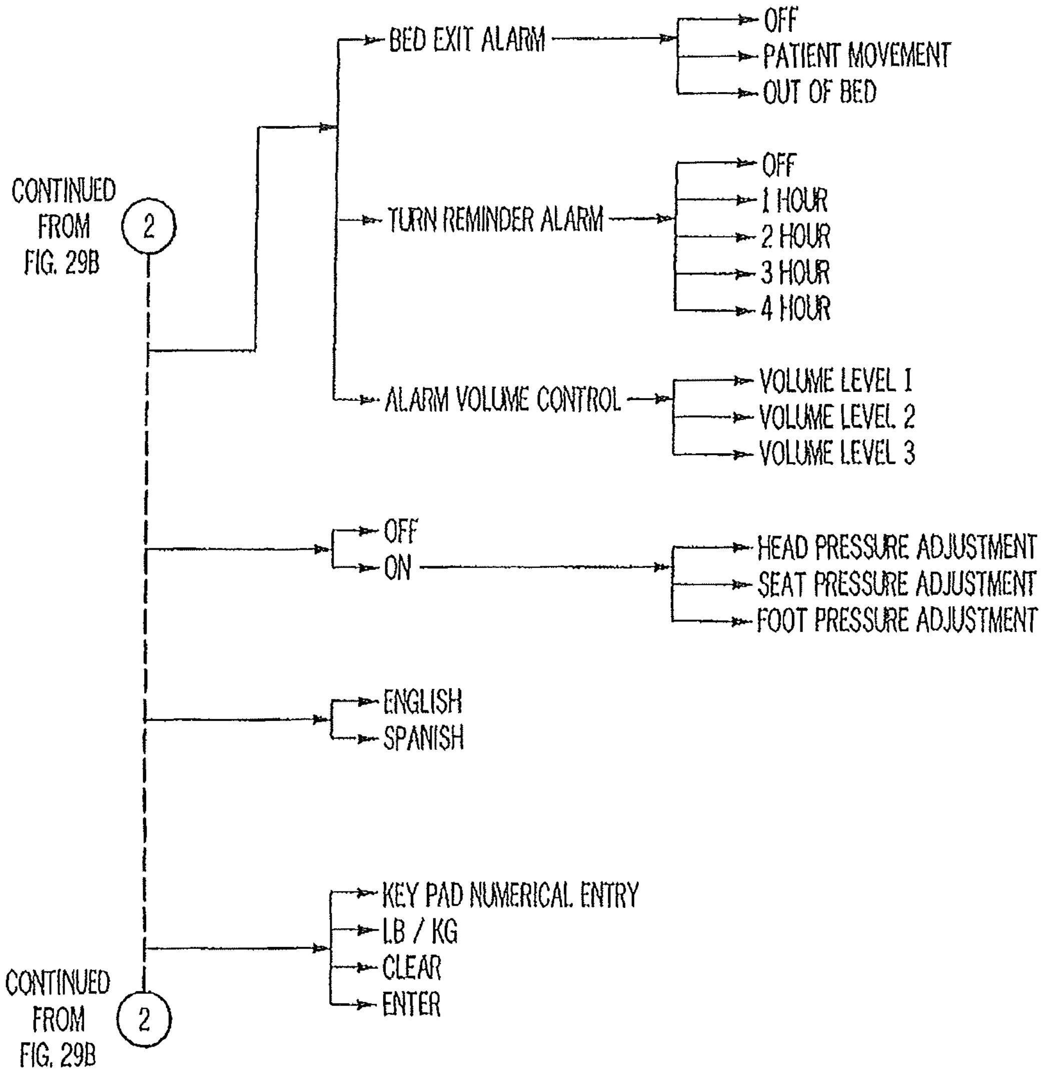
Figure 29D:
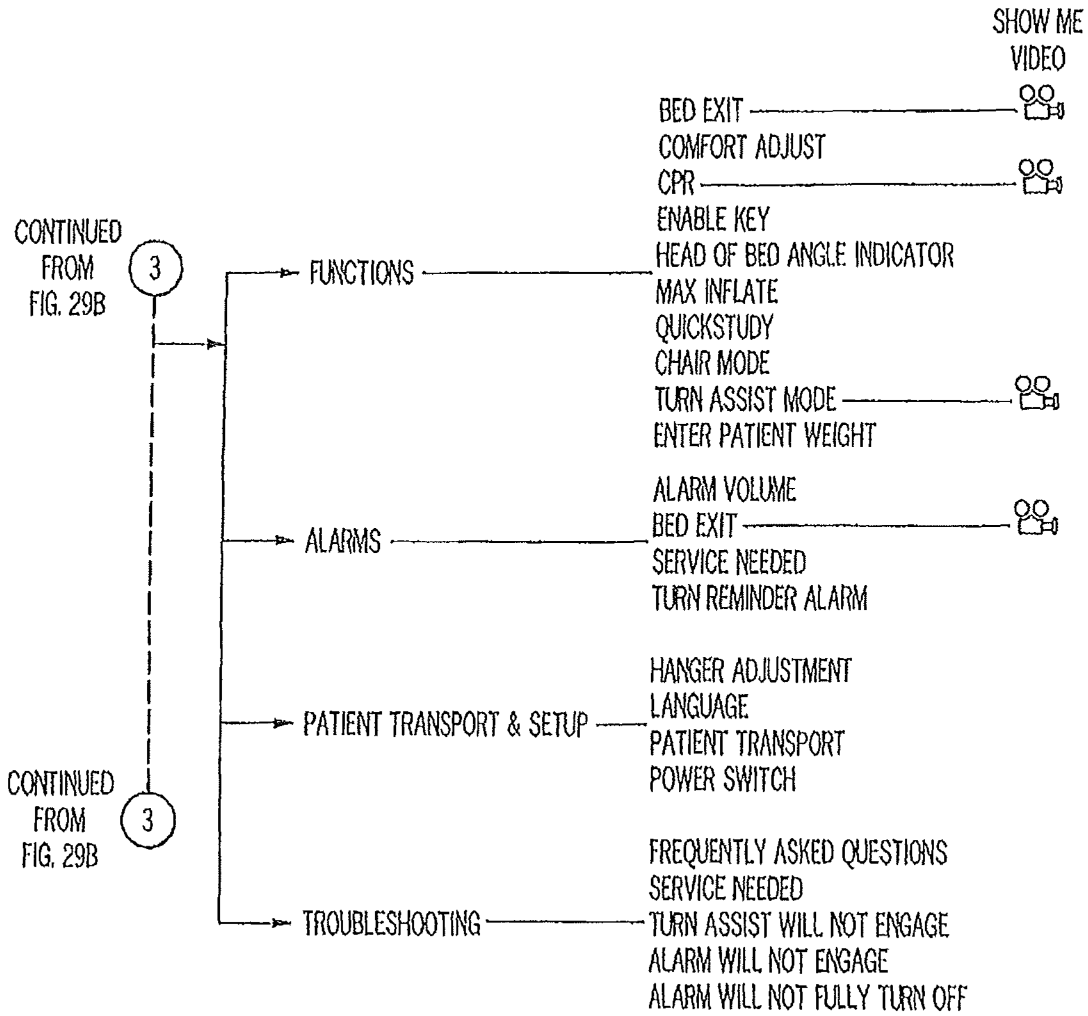

As described above, mattress 900 of FIGS. 23-24 is configured to be used with a variety of different beds and bed frames. Mattress 900 may be used with beds that are capable of assuming a chair position, such as the TotalCare® bed made by Hill-Rom, Inc. As indicated in FIG. 29B, display 1600 includes an interface screen 1624 for configuring and/or activating a chair mode. Chair mode is activated, typically by a technician, when the mattress 900 is installed on a TotalCare® or similar chair bed.

Mattress 900 of FIGS. 23-24 is configured to respond when the bed on which it is installed assumes a chair position. In the illustrated embodiment, mattress 900 detects when the bed is assuming chair position based on the head and foot angles detected by head angle sensor 1502 and foot angle sensor 1262. For example, in one instance chair position is detected when the head angle of the mattress 900 is greater than about 60 degrees above the horizontal and the foot angle of the mattress has dropped about 45 degrees below the horizontal. Mattress 900 detects chair position independently of the supporting bed, i.e., without receiving any data from the bed frame.

In the illustrated embodiment, when mattress 900 detects chair position, certain adjustments are made to the mattress. Pressure in the head zone bladders 960 is reduced slightly and air in the foot zone bladders 964 is evacuated to facilitate a patient's egress from the mattress or to increase the patient's comfort while the patient is in a sitting up position. In additional, mattress therapies such as max-inflate and turn-assist are disabled in chair mode.

Figure 30:
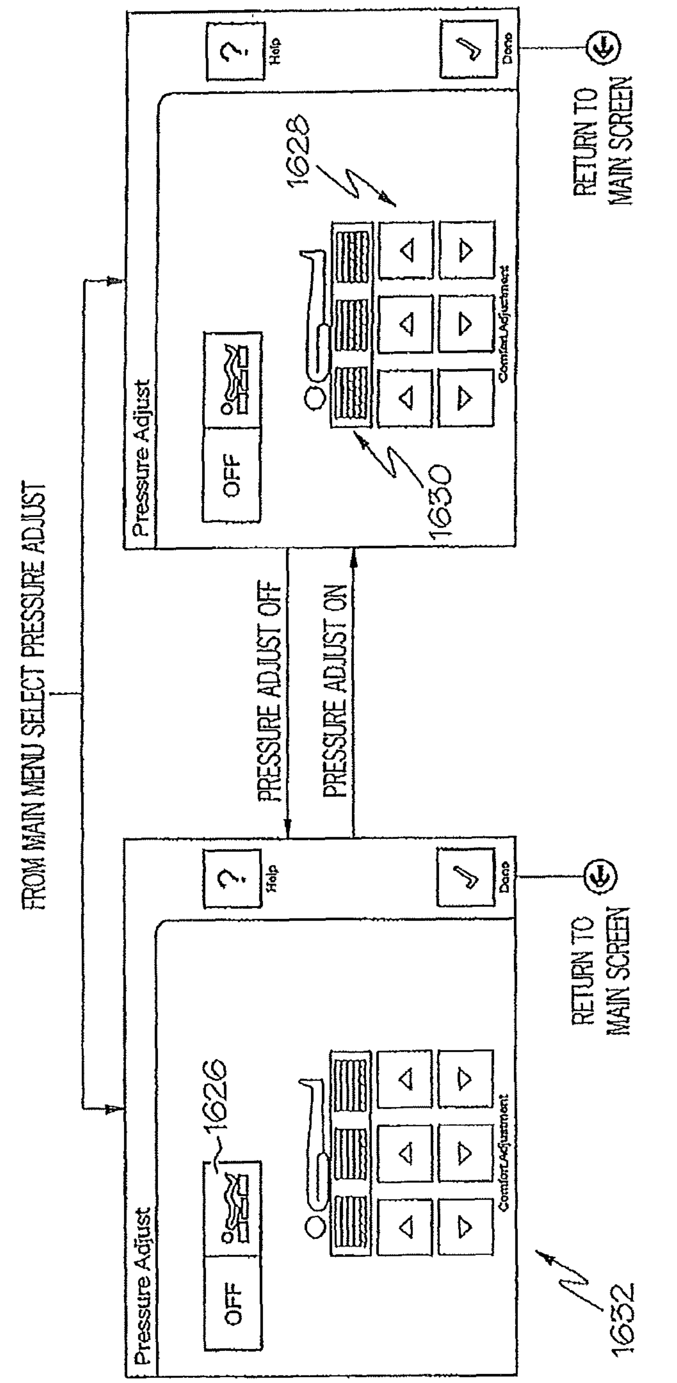
FIG. 30 is an exemplary menu flow diagram illustrating user interaction with a patient support to adjust pressure in one or more zones of the patient support.

While mattress 900 automatically sets and controls the pressure in the bladder zones 960, 962, 964 in many instances, mattress 900 also provides a pressure adjustment feature that enables an authorized person to manually increase or decrease pressure within a defined range in one or more of the zones 960, 962, 964 to increase comfort for an individual patient (i.e., based on the individual patient's preferences). FIG. 30 depicts interactive screens by which an authorized person may accomplish such manual adjustments. Aspects of this feature are also described in PCT application No. PCT/US06/26787 filed Jul. 7, 2006, which is incorporated herein by reference.

As shown in FIG. 30, button 1626 of interactive display 1630 may be activated to enable the manual pressure adjustment feature. A graphical depiction 1632 of a person lying on a mattress is shown when the feature is active. The graphical depiction of the mattress includes head, seat, and foot sections, in which pressure bars 1630 are displayed. Below the graphical depiction of the mattress in the illustrated embodiment are pressure adjustment controls 1628. Up arrow controls when activated increase pressure in the respective mattress zone, and down arrow controls decrease the pressure. Pressures bars 1630 graphically indicate the pressure level in each of the mattress sections. Additional pressure bars are added or darkened when pressure is increased. Pressure bars are removed or grayed out when pressure is decreased. The graphical depiction 1632 is updated in real time as an authorized person makes a pressure adjustment. In the illustrated embodiment, pressure adjustments (i.e., increases or decreases) are limited. In other words, manual pressure adjustments can be made within a defined pressure range. For example, the maximum increase or decrease permitted by the mattress may be plus or minus about 2 inches of water.

Figure 31:
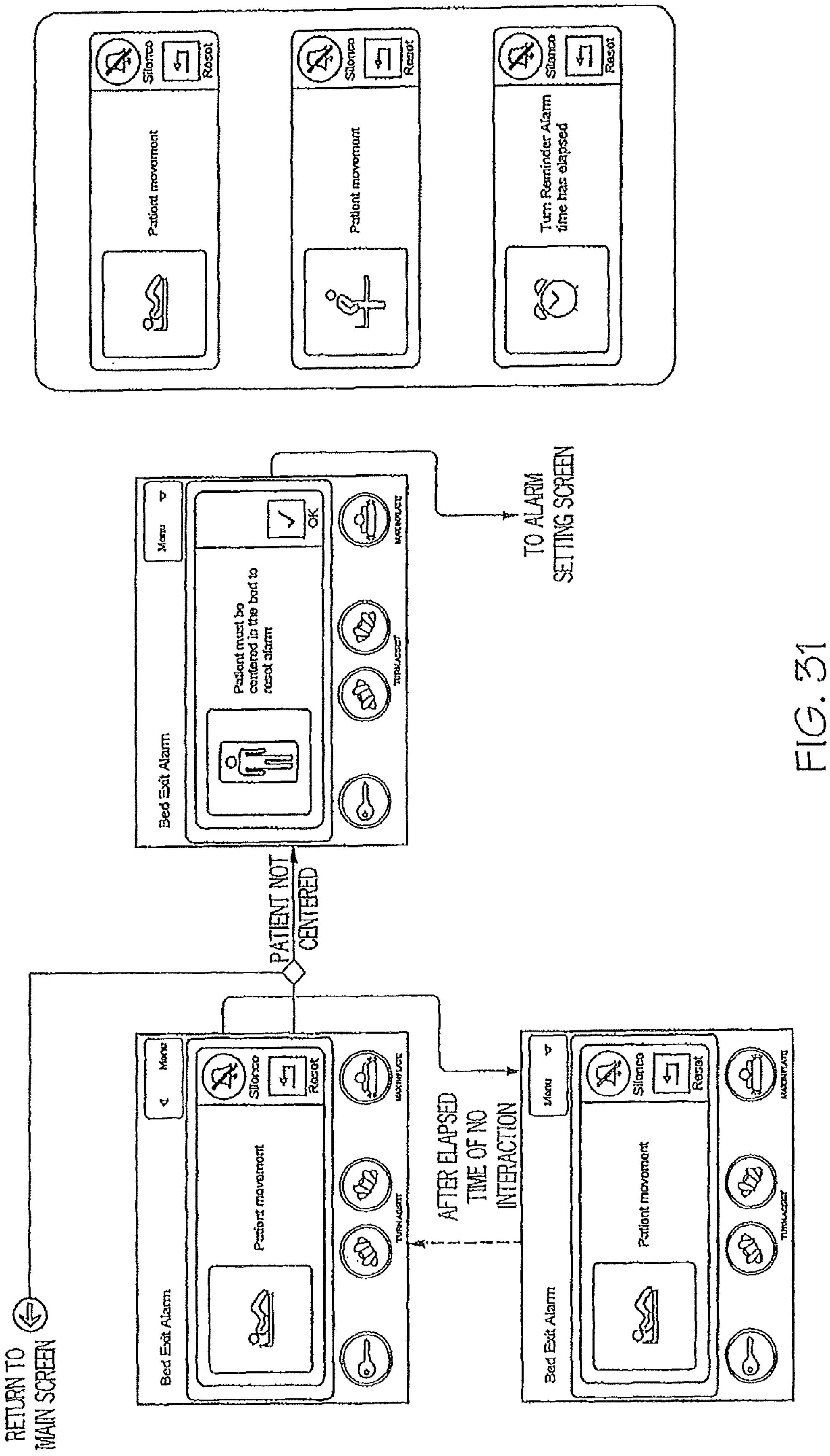
FIG. 31 is an exemplary menu flow diagram illustrating user interaction with a patient support to configure one or more automatic alarms or notifications.

FIG. 31 shows graphical interactive displays of control unit 1542 for configuring alarm notifications or alerts. For example, a caregiver may configure an alarm to be activated when the mattress 900 detects a patient exiting the bed (i.e., via data from sensor assemblies 968, 970). Also, a caregiver may configure a turn reminder to be activated after a predetermined period of time to remind the caregiver that the patient needs to be rotated or needs some other therapy, medication, or care. Such alarms or notifications may take the form of a visual signal such as an illuminated light or change to the graphical display, an email message, a text message sent to a caregiver's remote device or similar suitable notification.

Figure 32:
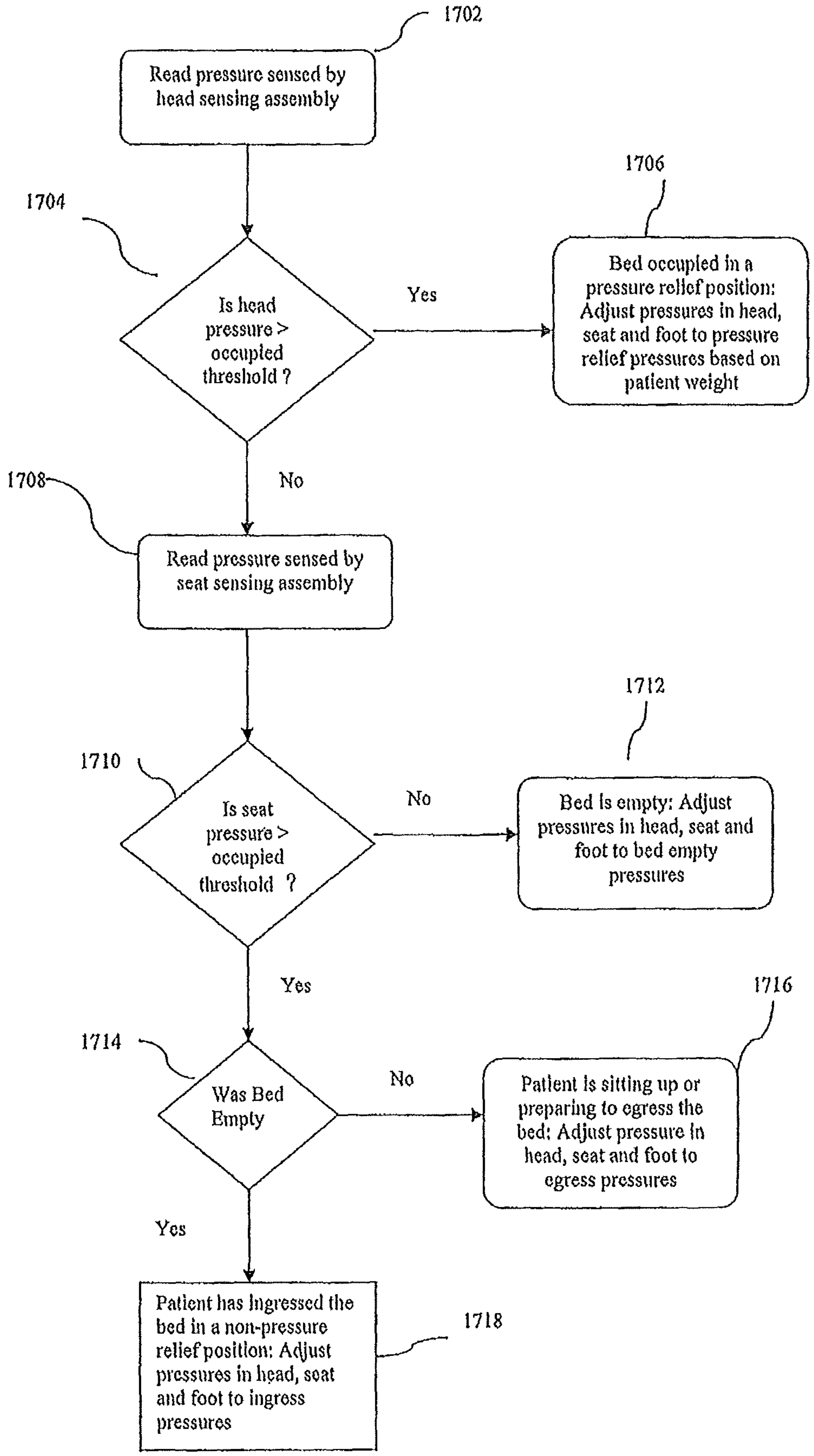
FIG. 32 is a simplified flow diagram illustrating logic used by a mattress described herein to detect occupancy or non-occupancy and adjust the air pressure in mattress bladders accordingly.

FIG. 32 is a simplified flow diagram illustrating logic used by mattress 900 to detect occupancy or non-occupancy and adjust the air pressure in mattress bladders accordingly. Sensor assemblies 968, 970 are used to sense pressure applied to head and seat zones 960, 962 respectively, i.e. by a patient positioned on mattress 900. At block 1702, pressure sensed by the sensing assembly 970 located underneath the head zone bladders 960 is detected and processed via programming logic of the control unit 1542 and circuitry of sensor hub 1252. Programming logic determines at block 1704 whether the sensed head zone pressure exceeds a threshold pressure value. If the sensed head section pressure does exceed the threshold pressure value, then the system concludes that the mattress 900 is currently occupied in a pressure relief position and automatically adjusts the cushion pressures in the head, seat, and foot zones to a predetermined amount based on the patient's weight at block 1706 (i.e. increasing or decreasing the pressure in the zones 960, 962, 964 as needed). An individual patient's weight may be input through interactive display 1600 as shown in FIG. 29B.

In one embodiment, initial bladder pressures in the head, seat and foot zones are determined and adjusted by the algorithm control unit based on the patients' weight. After a predetermined time delay (i.e., about 3-6 seconds), pressure in the head zone may be adjusted again if the head angle as determined by the head angle sensor has changed. For example, if the head angle is lowered below 30.degree., the pressure in the head section bladders may be adjusted to another predetermined desired level, and likewise if the head angle changes so that it is within the range of 30-45.degree., and again if the head angle increases to 45.degree. or greater.

In the illustrated embodiment, the head angle sensor includes multiple discrete ball sensors that indicate when the head section of the mattress reaches different discrete angles (i.e., 0, 5, 15, 30, 45, 60 degrees). The head angle may also be factored into the initial pressure adjustment along with the patient's weight. In general, the algorithm control unit maintains the "bed occupied-pressure relief" pressures as long as the mattress is in pressure relief mode and the pressure sensors indicate that the mattress is occupied by a patient in a pressure relief position (such as a lying down or prone position). If the pressure sensors indicate that the patient has exited the bed, the mattress transitions to "bed empty" mode, block 1712.

If the sensed head section pressure does not exceed the threshold, then the system proceeds to read the pressure sensed by the seat pressure sensing assembly at block 1708. The pressure sensed in the seat section is compared to a seat section pressure threshold value. The seat section threshold may be the same as or different than the head section threshold value. If the sensed seat zone pressure does not exceed the seat section threshold pressure value, then the system concludes that the mattress is empty or not occupied. In such event, mattress 900 automatically adjusts pressure in the bladder assemblies 960, 962 and/or 964 at block 1712 for the "bed empty" mode, which may include adjusting the pressures to prepare for ingress of another patient. Additionally, pressure in one or more of the bolsters and/or filler bladders may be adjusted according to the type of bed frame supporting the mattress 900.

If the sensed seat zone pressure does exceed the seat section threshold value, the system then performs an additional analysis at block 1714 to access the current position of the mattress. If the system determines that the mattress was previously empty (i.e. in state 1712) then it concludes that the patient has ingressed the bed. In such event, the system adjusts the pressures in the zones 960, 962, 964 to predetermined desirable ingress pressures at block 1718.

If the sensed seat zone pressure exceeds the threshold but the mattress was not previously detected as being empty, the system concludes that a patient is sitting up or preparing to exit or egress the bed and adjusts the pressures in the head, seat and foot zones to predetermined desirable "egress" pressure levels to aid the patient in exiting the bed or to provide additional comfort or support to the patient in the sitting up position, at block 1716. Pressure in the foot bolsters may also be adjusted at block 1716. Such adjustments of pressure in the bolsters may be based on the type of bed frame supporting the patient. The bed frame type may be manually input by an authorized person and stored in memory by the algorithm control unit.

In determining whether a sensed pressure exceeds a threshold value, the amount of pressure sensed (i.e., inches of water) and the period of time over which the pressure is continuously sensed are considered. For example, in the illustrated embodiment, a sensed pressure is considered to exceed the threshold if it is greater than or equal to the threshold value continuously for move than 2 seconds. In the illustrated embodiment, the threshold values are determined based on statistical analysis of data obtained through a number of different trials involving occupied and unoccupied mattresses.

In other embodiments, the pressure sensing assemblies 968, 970 may alternatively or in addition be used to determine patient weight. As mentioned above, a strain gauge based sensor may be used in place of the fluid-filled bladder sensors for determining occupancy and/or patient weight. Another algorithm that may be used to determine bed occupancy and/or patient weight is similar to that disclosed in U.S. Provisional Patent Application No. 60/702,645, filed Jul. 26, 2005, entitled SYSTEM AND METHOD OF CONTROLLING AN AIR MATTRESS, and its corresponding non-provisional counterpart, which are incorporated hereby this reference.

The present invention has been described with reference to certain exemplary embodiments, variations, and applications. However, the present invention is defined by the appended claims and therefore should not be limited by the described embodiments, variations, and applications.

The invention claimed is:

1. A patient support comprising:

a cover defining an interior region;

an air permeable first layer located in the interior region;

a support layer located beneath the air permeable first layer, the support layer comprised of a plurality of air bladders;

a pressure sensing layer located underneath the support layer;

at least one air supply coupled to the support layer, the first layer being connected to the air supply; and a controller coupled to the air supply and to the pressure sensing layer to control inflation and deflation of the bladders and to control air flow through the first layer in response to signaling from the pressure sensing layer.

2. The patient support of claim 1 wherein the plurality of air bladders includes one or more transverse bladders and one or more upright can-shaped bladders.

3. The patient support of claim 1 wherein the at least one air supply comprises:

1) a first air supply coupled to the first layer for providing the air flow through the first layer and 2) a second air supply coupled to the bladders for effecting the inflation and deflation of the bladders.

4. The patient support of claim 1 wherein:

1) the support layer comprises first, second and third zones; and 2) the pressure sensing layer comprises at least one pressure sensing assembly positioned underneath at least one of the zones.

5. The patient support of claim 4 wherein the pressure sensing layer comprises a first pressure sensing assembly positioned underneath the first support layer zone, a second pressure sensing assembly positioned underneath the second support layer zone, and a third pressure sensing assembly positioned underneath the third support layer zone.

6. The patient support of claim 5 wherein:

the first support layer zone is a head support layer zone, the second support layer zone is a seat support layer zone, and the third support layer zone is a foot support layer zone; and the pressure sensing layer comprises a head pressure sensing assembly positioned underneath the head support layer zone, a seat pressure sensing assembly positioned underneath the seat support layer zone, and a foot pressure sensing assembly positioned underneath the foot support layer zone.

7. The patient support of claim 6 wherein the controller adjusts pressure in one or more of the head zone support layer bladder, the seat zone support layer bladder and the foot zone support layer bladder based on a signal from at least one of the pressure sensing assemblies.

8. The patient support of claim 1 wherein the pressure sensing layer comprises one or more fluid-filled bladders and a pressure transducer.

9. The patient support of claim 8 wherein the bladder is filled with silicone oil or gel.

10. The patient support of claim 1 wherein the support layer includes a head section bladder assembly, a seat section bladder assembly, and a foot section bladder assembly, and the pressure sensing layer includes a sensor assembly or assemblies positioned under only the head section bladder assembly and the seat section bladder assembly.

11. The patient support of claim 10 wherein the head section bladder assembly comprises transverse bladders and the seat section bladder assembly comprises transverse bladders.

12. The patient support of claim 11 wherein the foot section bladder assembly comprises upright can shaped bladders.

13. A patient support comprising:

a cover defining an interior region;

a first layer located in the interior region;

a support layer located beneath the first layer, the support layer comprised of one or more transverse bladders and one or more upright can-shaped bladders;

a pressure sensing layer located underneath the entirety of the support layer;

at least one air supply coupled to the support layer; and a controller coupled to the air supply and to the pressure sensing layer to control inflation and deflation of the bladders in response to a signal from the pressure sensing layer.

14. The patient support of claim 13 wherein:

1) the first layer is connected to the air supply and 2) the controller controls air flow through the first layer in response to the signal from the pressure sensing layer.

15. The patient support of claim 13 wherein the at least one air supply comprises:

1) a first air supply coupled to the first layer for providing the air flow through the first layer and 2) a second air supply coupled to the bladders for effecting the inflation and deflation of the bladders.

16. The patient support of claim 13 wherein the pressure sensing layer comprises a first pressure sensing assembly positioned underneath the first support layer zone, a second pressure sensing assembly positioned underneath the second support layer zone, and a third pressure sensing assembly positioned underneath the third support layer zone.

17. The patient support of claim 16 wherein:

the first support layer zone is a head support layer zone, the second support layer zone is a seat support layer zone, and the third support layer zone is a foot support layer zone; and the pressure sensing layer comprises a head pressure sensing assembly positioned underneath the head support layer zone, a seat pressure sensing assembly positioned underneath the seat support layer zone, and a foot pressure sensing assembly positioned underneath the foot support layer zone.

18. The patient support of claim 17 wherein the controller adjusts pressure in one or more of the head zone support layer bladder, the seat zone support layer bladder and the foot zone support layer bladder based on a signal from at least one of the pressure sensing assemblies.

19. The patient support of claim 13 wherein the pressure sensing layer comprises one or more fluid-filled bladders and a pressure transducer.

20. The patient support of claim 19 wherein the bladder is filled with silicone oil or gel.

21. The patient support of claim 13 wherein the head section bladder assembly comprises transverse bladders and the seat section bladder assembly comprises transverse bladders.

22. The patient support of claim 21 wherein foot section bladder assembly comprises upright can shaped bladders.

23. The patient support of claim 13 wherein the support layer comprises longitudinally distributed first, second and third support layer zones the pressure sensing layer comprises longitudinally distributed first, second and third pressure sensing assemblies, the first pressure sensing assembly is positioned underneath the first support layer zone, the second pressure sensing assembly is positioned underneath the second support layer zone, and the third pressure sensing assembly is positioned underneath the third support layer zone.

24. A patient support comprising:

a cover defining an interior region;

a first layer located in the interior region;

a support layer located beneath the air permeable first layer, the support layer comprised of a plurality of air bladders;

a pressure sensing layer located underneath the support layer, the pressure sensing layer comprising one or more fluid filled bladders and a pressure transducer;

at least one air supply coupled to the support layer; and a controller coupled to the air supply and to the pressure sensing layer to control inflation and deflation of the bladders in response to a signal from the pressure sensing layer.

25. The patient support of claim 24 wherein the bladder is filled with silicone oil or gel.

26. A patient support comprising:

a cover defining an interior region;

a first layer located in the interior region;

a support layer located beneath the first layer, the support layer comprised of a head section bladder assembly comprised of transversely extending bladders, a seat section bladder assembly comprised of transversely extending bladders, and a foot section bladder assembly;

a pressure sensing layer located underneath only the head section bladder assembly and the seat section bladder assembly, the pressure sensing layer comprising a pressure sensor assembly or assemblies;

at least one air supply coupled to the support layer;

and a controller coupled to the air supply and to the pressure sensing layer to control inflation and deflation of the bladders in response to a signal from the pressure sensing layer.

27. The patient support of claim 26 wherein the foot section bladder assembly comprises upright can shaped bladders.

* * * * *